US006754494B1

(12) United States Patent
Yoshimura

(10) Patent No.: US 6,754,494 B1
(45) Date of Patent: Jun. 22, 2004

(54) MOBILE COMMUNICATION SYSTEM HAVING A LEARNING-TYPE HANDOVER CONTROL METHOD

(75) Inventor: Manabu Yoshimura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/516,499

(22) Filed: Mar. 1, 2000

(30) Foreign Application Priority Data

Dec. 6, 1999  (JP) .......................................... 11-345752

(51) Int. Cl.[7] .............................................. H04Q 7/20
(52) U.S. Cl. ...................... 455/436; 455/437; 455/438; 455/443; 370/331; 370/332
(58) Field of Search ................................ 455/436–438, 455/443, 525, 514; 370/331, 332, 328

(56) References Cited

U.S. PATENT DOCUMENTS

| | | | | |
|---|---|---|---|---|
| 5,848,063 A | * | 12/1998 | Weaver ....................... | 370/331 |
| 5,854,981 A | * | 12/1998 | Wallstedt et al. ........... | 455/422 |
| 5,903,840 A | * | 5/1999 | Bertacchi .................... | 370/332 |
| 5,907,807 A | * | 5/1999 | Chavez ....................... | 455/435 |
| 5,999,816 A | * | 12/1999 | Tiedemann ................. | 455/436 |
| 6,038,448 A | * | 3/2000 | Chheda et al. .............. | 455/436 |
| 6,078,817 A | * | 6/2000 | Rahman ...................... | 455/452 |
| 6,240,291 B1 | * | 5/2001 | Narasimhan et al. ....... | 455/422 |
| 6,259,918 B1 | * | 7/2001 | Labonte et al. ............. | 455/436 |
| 6,393,282 B1 | * | 5/2002 | Iimori ......................... | 455/432 |

FOREIGN PATENT DOCUMENTS

| | | |
|---|---|---|
| EP | 0566548 | 10/1993 |
| EP | 0849967 | 6/1998 |
| JP | 05316023 | 11/1993 |
| JP | 10200946 | 7/1998 |

OTHER PUBLICATIONS

A. Salmasi et al, "On the System Design Aspects of Code Division Multiple Access (CDMA) Applied to Digital Cellular and Personal Communications Networks" IEEE Proceedings, pp. 57–62.
D. Wong, et al, "Multi–State Pattern Recognition Handoff Algorithms", IEEE Proceedings, pp. 1420–1425.
R. Narasimhan, et al, "A Handoff Algorithm for Wireless Systems using Pattern Recognition", Department of Electrical Engineering, IEEE Proceedings, pp. 335–339.
H. Maturino–Lozoya, et al, "Pattern Recognition Techniques in Handoff and Service Area Determination", IEEE Proceedings, pp. 96–100.

* cited by examiner

*Primary Examiner*—Nay Maung
*Assistant Examiner*—Sujatha Sharma
(74) *Attorney, Agent, or Firm*—Antonelli, Terry, Stout & Kraus, LLP

(57) ABSTRACT

In order to reduce an unnecessary handover process incident to a sudden change in communication quality, a collection circuit collects information as to the signal quality between a mobile station and respective base stations. A learning circuit learns data for judging handover, based on the signal quality. A determination circuit determines matching between the data for judging the handover and the signal quality collected by the collection circuit. A handover control circuit performs control on handover between the mobile station and a base station brought to a handover additional or deletion candidate of the mobile station, based on the result of determination by the determination circuit.

13 Claims, 16 Drawing Sheets

ANOTHER EXAMPLE OF MEMORY UNIT 212

ANOTHER EXAMPLE OF MEMORY UNIT 212

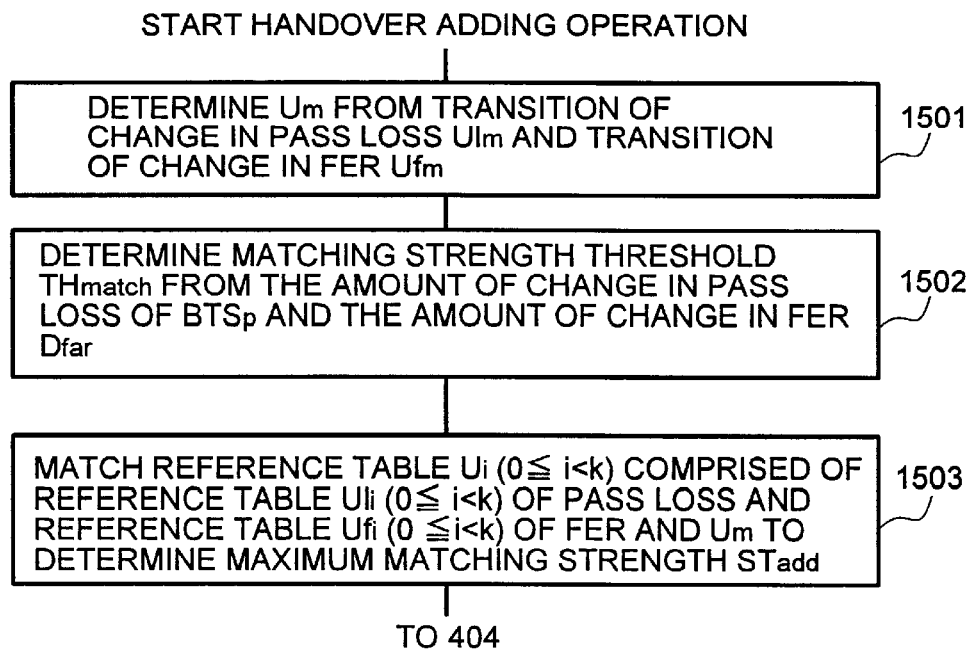
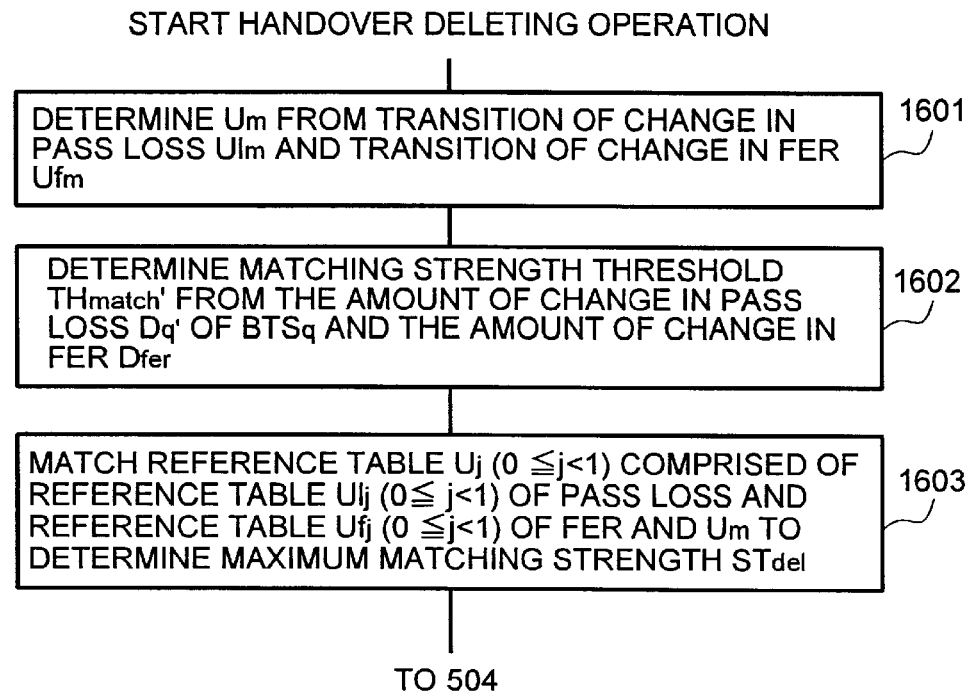

FIG.16

| TIME | BTS102 | | BTS103 | | BTS104 | | BTS102 |
|---|---|---|---|---|---|---|---|
| | PASS LOSS | SIR | PASS LOSS | SIR | PASS LOSS | SIR | FER |
| t-n | 2 | 20 | 10 | 6 | 7 | 7 | 0 |
| t-n+1 | 3 | 18 | 8 | 8 | 7 | 6 | 1 |
| . | . | . | . | . | . | . | . |
| . | . | . | . | . | . | . | . |
| . | . | . | . | . | . | . | . |
| t | 10 | 12 | 2 | 15 | 10 | 6 | 30 |
| | CONNECTED | | NON-CONNECTED | | NON-CONNECTED | | |

Um
Lm(t)

Ferm,p(t) / Ferm,q(t)

UNIT EXAMPLE : PASS LOSS ⋯ dB $\mu$   SIR ⋯ dB

FIG.17

| TIME | BTS102 PASS LOSS | BTS103 PASS LOSS | FER | | TRANSMITTER POWER LEVEL | |
|---|---|---|---|---|---|---|
| | | | BTS102 | BTS103 | BTS102 | BTS103 |
| t-n | 1 | 3 | 0 | 20 | 10 | 15 |
| t-n+1 | 3 | 5 | 5 | 25 | 14 | 20 |
| . | . | . | . | . | . | . |
| . | . | . | . | . | . | . |
| . | . | . | . | . | . | . |
| t | 4 | 8 | 10 | 40 | 15 | 30 |
| | CONNECTED | CONNECTED | | | | |

Lm(t)
Pm(t)
Ulm
Ferm,p(t) / Ferm,q(t)
Upm
Um

UNIT EXAMPLE : PASS LOSS ⋯dB $\mu$    TRANSMITTER POWER LEVEL ⋯dB

FIG.18

| TIME | BTS102 PASS LOSS | BTS103 PASS LOSS | BTS104 PASS LOSS | FER BTS102 | FER BTS103 |
|---|---|---|---|---|---|
| t-n | 1 | 4 | 12 | 0 | 20 |
| t-n+1 | 3 | 5 | 9 | 0 | 25 |
| . | . | . | . | . | . |
| . | . | . | . | . | . |
| . | . | . | . | . | . |
| t | 8 | 13 | 5 | 10 | 40 |
| | CONNECTED | CONNECTED | NON-CONNECTED | | |

$L_m(t)$ ← $t$ row · · · $Fer_m(t)$ $U_{lm}$ · · · $Fer_{m,p}(t)$ / $Fer_{m,q}(t)$ · · · $U_{fm}$ $U_m$ UNIT EXAMPLE : PASS LOSS ··· dBμ

FIG.19

| | BTS102 | | BTS103 | | BTS104 | | ... |
|---|---|---|---|---|---|---|---|
| TIME | PASS LOSS | SIR | PASS LOSS | SIR | PASS LOSS | SIR | |
| 0 | 1 | 20 | 10 | 6 | 8 | 8 | |
| 1 | 1 | 18 | 10 | 8 | 7 | 7 | |
| 2 | 3 | 15 | 6 | 11 | 6 | 9 | |
| . | . | . | . | . | . | . | |
| . | . | . | . | . | . | . | |
| . | . | . | . | . | . | . | |
| n | 8 | 5 | 2 | 19 | 9 | 6 | |
| ADDED BASE STATION : BTS103 | | | | | | | |

$U_{k-1}$ ... $U_o(0)$ ... $U_o(n)$ ... $U_o$

UNIT EXAMPLE : PASS LOSS ···dBμ  SIR···dB

FIG.20

| TIME | BTS102 | | BTS103 | | BTS104 | | ... |
| --- | --- | --- | --- | --- | --- | --- | --- |
| | PASS LOSS | SIR | PASS LOSS | SIR | PASS LOSS | SIR | |
| 0 | 2 | 18 | 4 | 16 | 3 | 17 | |
| 1 | 4 | 18 | 4 | 16 | 5 | 14 | |
| 2 | 2 | 18 | 5 | 14 | 8 | 12 | ... |
| . | . | . | . | . | . | . | |
| . | . | . | . | . | . | . | |
| . | . | . | . | . | . | . | |
| n | 6 | 17 | 4 | 13 | 15 | 3 | |
| DELETED BASE STATION : BTS104 | | | | | | | |

UNIT EXAMPLE : PASS LOSS ···dB μ    SIR···dB

FIG.21

| TIME | BTS102 PASS LOSS | BTS103 PASS LOSS | ... |
| --- | --- | --- | --- |
| 0 | 1 | 10 | |
| 1 | 1 | 10 | |
| 2 | 3 | 6 | ... |
| . | . | . | |
| . | . | . | |
| . | . | . | |
| n | 8 | 2 | |
| ADDED BASE STATION : BTS103 | | | |

| TIME | BTS104 POWER LEVEL | ... |
| --- | --- | --- |
| 0 | 5 | |
| 1 | 6 | |
| 2 | 9 | ... |
| . | . | |
| . | . | |
| . | . | |
| n | 15 | |

UNIT EXAMPLE : PASS LOSS ···dB μ

UNIT EXAMPLE : PASS LOSS POWER LEVEL···dB

UNIT EXAMPLE : PASS LOSS ⋯dB μ

UNIT EXAMPLE : PASS LOSS ⋯dB μ   SIR⋯dB

MOBILE COMMUNICATION SYSTEM HAVING A LEARNING-TYPE HANDOVER CONTROL METHOD

BACKGROUND OF THE INVENTION

The present invention relates to a mobile radio communication system (hereinafter called "CDMA mobile communication system") using code segmenting multiplex connection technology, and to a technique for performing more optimum handover.

In a mobile communication system, a mobile station selects or performs switching to a base station used as a communicating partner according to its movement, whereby the mobile station is able to communicate therewith continuously even if it moves. This base station switching operation is called "handover". A base station controller selects a base station low in pass loss of an electromagnetic wave transferred between a mobile station and each base station and large in signal to interference power ratio (hereinafter called "SIR") and connects the selected base station and the mobile station. In the present application, this operation is called "handover adding operation". On the other hand, the base station controller releases or sets free a connection to a base station related to handover, which is large in pass loss and low in SIR in order to reduce the occupation of an unnecessary radio line. In the present application, this operation is called "handover deleting operation". Thus, the mobile station is connected to a plurality of base stations which resembles in pass loss and SIR and sets free the connection to unnecessary base stations, whereby a high-quality communication state thereof is kept with the required minimum radio resources. Incidentally, the inventions disclosed in Japanese Patent Application Publication Laid-Open Nos. Hei 5-316023 and Hei 10-200946 are known as prior arts.

SUMMARY OF THE INVENTION

On the other hand, when a mobile station moves in building-dense regions such as cities, a pass loss and SIR suddenly change. Since only line quality of a perch channel at the present time makes an opportunity to perform handover in the related art, a handover adding operation and a handover deleting operation are frequently carried out when the pass loss and SIR continuously change suddenly.

The related art is based on the premise that a mobile station is connected to one base station alone, and never communicates with a plurality of base stations simultaneously. On the other hand, a CDMA mobile station is capable of being connected to a plurality of base stations simultaneously by taking advantage of a CDMA system (it is not uncommon that the mobile station is connected to three base stations simultaneously). Therefore, it is difficult to suitably select a base station brought to a handover additional candidate or a base station brought to a handover deletion candidate. Thus, an unsuitable candidate might be selected. Since the handover is processed using a connected time or the mean value of maximum transmitter power levels in the related art, a base station which is free of existence in a moving direction, i.e., is not to be originally connected, is brought to a handover candidate depending on a call time or the like of a mobile station having carried out the handover in the past. Also, even in the case of a sector type base station in which one cell is divided into a plurality of areas, handover processing much than required might be performed. There is, for example, a case in which a mobile station approaches right at the sector base station and radio waves from a plurality of sectors can be received with substantially the same pass loss and SIR.

If the base station not to be connected or originally set free is taken as the candidate for handover processing in this way, then the repetition of unnecessary handover adding/deleting operations might occur continuously. Thus, if the unnecessary handover adding operation and handover deleting operation are repeated, various resources such as CPU, a radio resource, etc. are consumed than required by the mobile station, base stations and base station controller. This consumption would bring about a delay with respect to the operation to be originally performed by the corresponding mobile station or another mobile station, thus leading to degradation in communication state. Further, the unsuitable execution of handover results in cutting-off of a calling.

Therefore, an object of the invention of the present application is to effectively take advantage of resources by reducing unnecessary handover. Another object of the invention of the present application is to reduce unnecessary handover so as to improve a processing delay of a system and provide more stable and high-quality communications.

According to the invention of the present application, as a method of solving the above-described problem, time-sequential data about pass losses and SIR (or transmitter power level and communication quality at base stations) of channels intended for the measurement of received levels, which are transmitted from connected base stations and non-connected base stations to a mobile station, and learning data are compared, and a handover additional base station or a handover deletion base station is selected from the degree of similarity thereof. As the learning data, ones (hereinafter called "reference tables") obtained by updating the above-described time-sequential data, based on the result of the past handover adding operation and handover deleting operation are used. A handover candidate base station is selected based on time-sequential data about pass losses and SIR (or transmitter power level and communication quality at base stations) from a plurality of base stations, i.e., the transition of their change. Thus, since the suitable base station can be selected, it is possible to restrain the repetition of the handover operation, control the use of unnecessary radio resources in its turn and suppress the influence of communication quality to the corresponding mobile station and other mobile stations. The use of information from connected base stations and non-connected base stations makes it possible to provide satisfactory handover even in the case of a CDMA mobile communication system connected to a plurality of base stations simultaneously.

Further, handover operating conditions are determined based on combinations of time-sequential data such as the aforementioned pass losses and SIR or pass losses and transmitter power levels, or pass losses and frame error rate (hereinafter called "FER"), etc. so that connections much than required are avoided when the state of communications with each connected base station is good. When the state of the communications with each connected base station is poor in reverse, a handover adding operation is executed earlier rather than when the state of the communications therewith is good, so that the corresponding mobile station can be connected to a plurality of base stations.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 14 shows a handover adding method using FER;

FIG. 15 illustrates handover deleting method using FER;

FIG. 16 depicts a table in which pass losses and SIR are stored;

FIG. 17 shows a table in which pass losses and transmitter power levels are stored;

FIG. 18 illustrates a table in which pass losses and FER are stored;

FIG. 19 depicts handover adding reference tables in which pass losses and SIR are stored;

FIG. 20 shows handover deleting reference tables in which pass losses and SIR are stored;

FIG. 21 illustrates handover adding reference tables in which pass losses and transmitter power levels are stored;

DESCRIPTION OF THE PREFERRED EMBODIMENT

1. Best Mode

Figure 1:
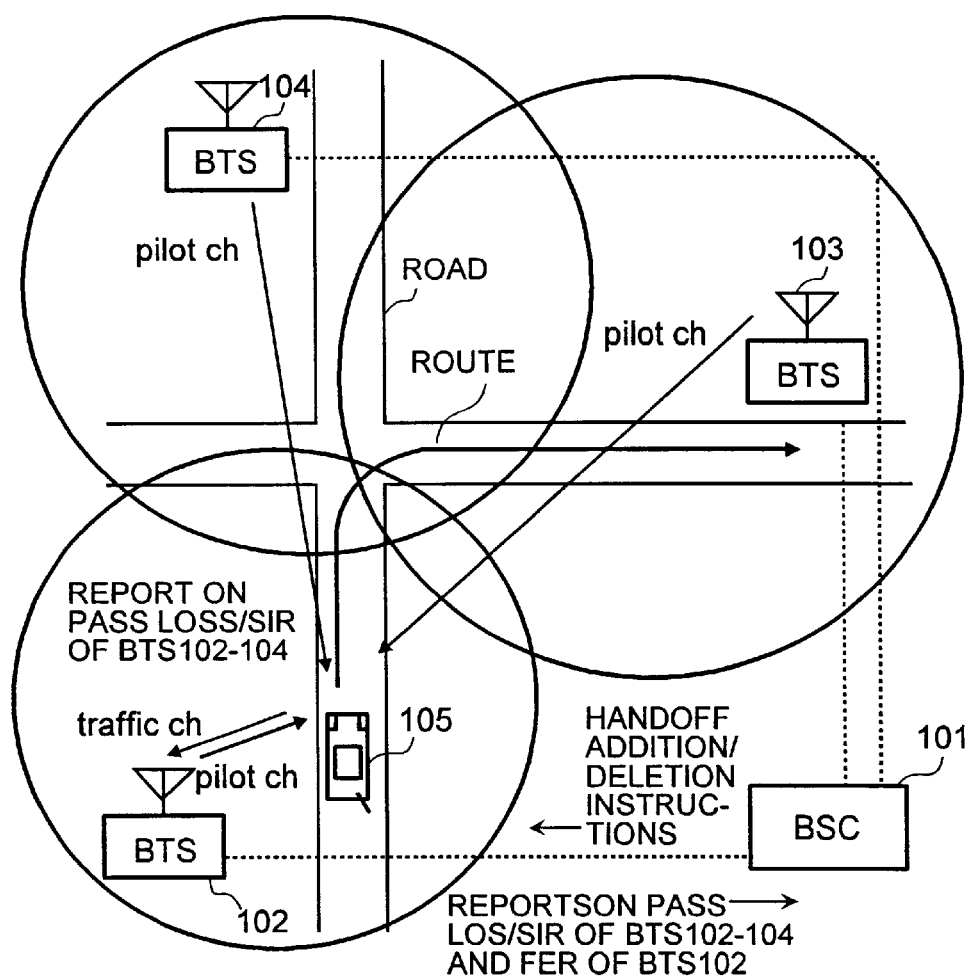
FIG. 1 shows the status of connections at handover.

An embodiment according to the invention of the present application will hereinafter be described. FIG. 1 shows the status of connections at handover in a CDMA mobile communication system. A base station controller 101 connects base stations 102 to 104 to a mobile station 105 through radio or wireless lines. The mobile station 105 is a wireless terminal such as a portable telephone. The mobile station 105 moves on the road along a travel route and is now in the course of being connected to the base station 102. In the related art, the mobile station 105 thereafter had an unnecessary connection to the base station 104 which does not exist on the travel route of the mobile station 105. In the invention of the present application, however, the mobile station 105 smoothly performs handover without being connected to the base station 104. Incidentally, the handover at CDMA means not only switching between base stations but also during connection. This is because upon CDMA, communications are made while a mobile station is being connected to a plurality of base stations simultaneously.

Figure 2:
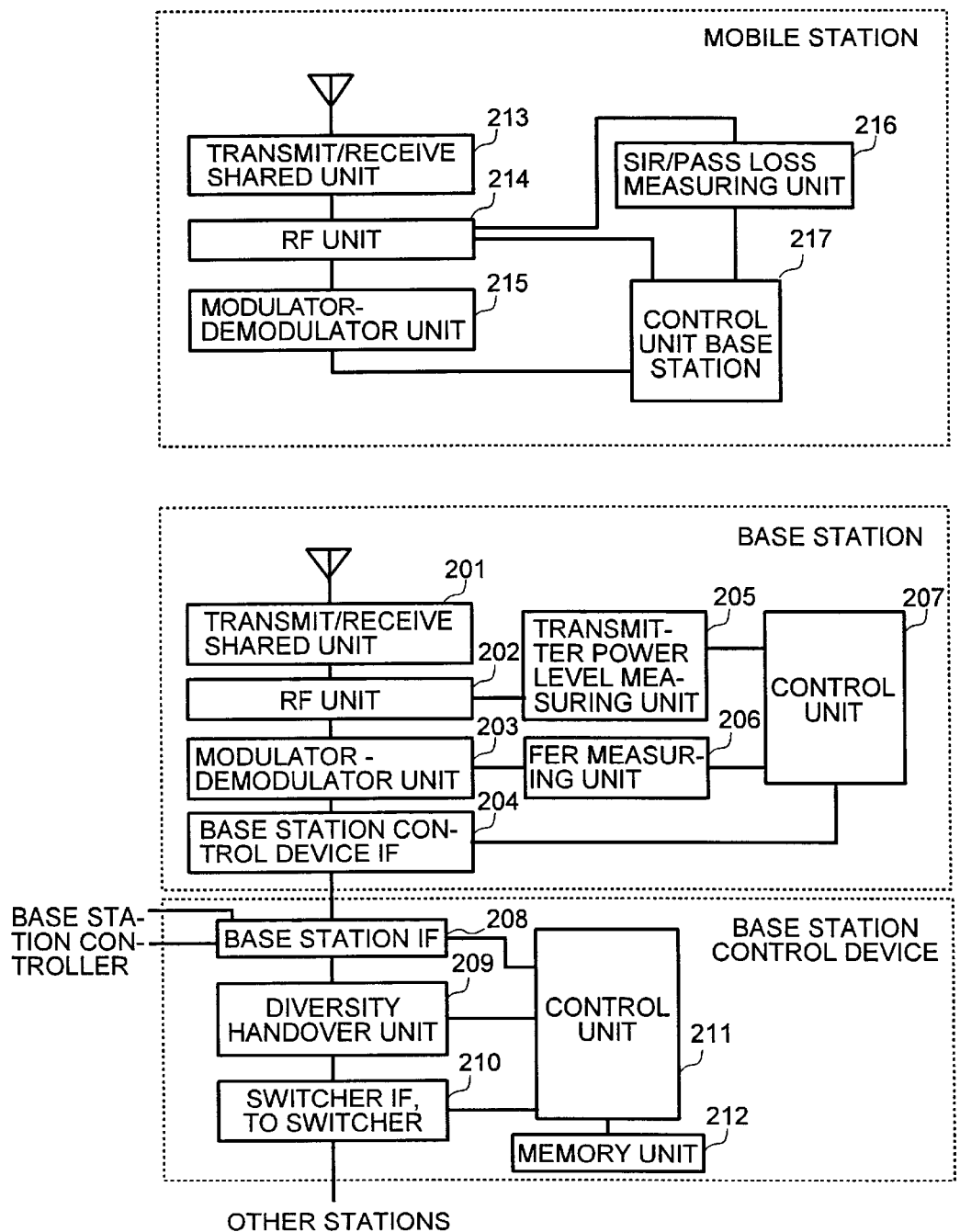
FIG. 2 illustrates configurations of a base station and a base station controller.

FIG. 2 shows a configuration of the base station controller 101 and configurations of the base stations 102 through 104 and mobile station 105. A transmit/receive shared unit 201 converts a signal transmitted from a base station to a mobile station to a transmitting frequency and converts a signal received from the mobile station to the original frequency. A RF unit 202 performs a diffusion process on the signal to be transmitted to the mobile station by means of codes for CDMA mobile communications and performs a reverse diffusion process on the signal reversely received by the base station by means of codes for CDMA mobile communications to thereby extract a necessary signal. A modulator-demodulator unit 203 performs modulation, demodulation and error correction control on a digital signal. A base station controller IF 204 transmits and receives a signal to and from the base station controller 101. A transmitter power level measuring unit 205 measures a transmitter power level for a communication channel, which is transmitted to the mobile station, and reports the result of measurement to a control unit 211 of the base station controller through a control unit 207. An FER measuring unit 206 measures FER of a received communication channel and reports the result of measurement to the control unit 211 of the base station controller through the control unit 207. The control unit 207 controls the operations of the RF unit 202, modulator-demodulator unit 203 and base station control device IF 204 in response to a control signal for calling control, which is sent from a control unit 217 of the mobile station or the control unit 211 of the base station controller. A base station IF 208 performs the transmission and reception of signals to and from one or a plurality of base stations. A diversity handover unit 209 effectively merges the same signals which are sent from one mobile station and have reached from the plurality of base stations and reversely allows a signal to be sent to the corresponding mobile station to be transmitted from the plurality of base stations. An exchange or switcher IF 210 transmits signals to a switcher and receives them therefrom. The control unit 211 performs the transfer of control signals for calling control to and from the control unit 217 of the mobile station, the control unit 207 of the base station or the switcher so as to control the base station IF 208, diversity handover unit 209, switcher IF 210 and memory unit 212 to be described later. The memory unit 212 retains data about mobile stations or base stations placed under the base station controller. A transmit/receive shared unit 213 converts a signal sent from the mobile station to the base station to a transmitting frequency and converts a signal received from the base station to the original frequency. A RF unit 214 performs a diffusion process on a signal to be transmitted to the base station by means of codes for CDMA mobile communications and performs a reverse diffusion process on a signal reversely received by the mobile station by means of codes for CDMA mobile communications to thereby extract a necessary signal. A modulator-demodulator unit 215 performs modulation, demodulation and error correction control on a digital signal. A SIR/pass loss measuring unit 216 measures SIR and a pass loss on a channel intended for the measurement of a level received by the mobile station. The control unit 217 controls the operations of the RF unit 214 and modulator-demodulator unit 215 in response to a control signal for calling control, which is sent from the control unit 207 of the base station or the control unit 211 of the base station controller. Incidentally, while the respective parts are basically hardware, some or all thereof may be implemented by means of software as needed.

Figure 3A:
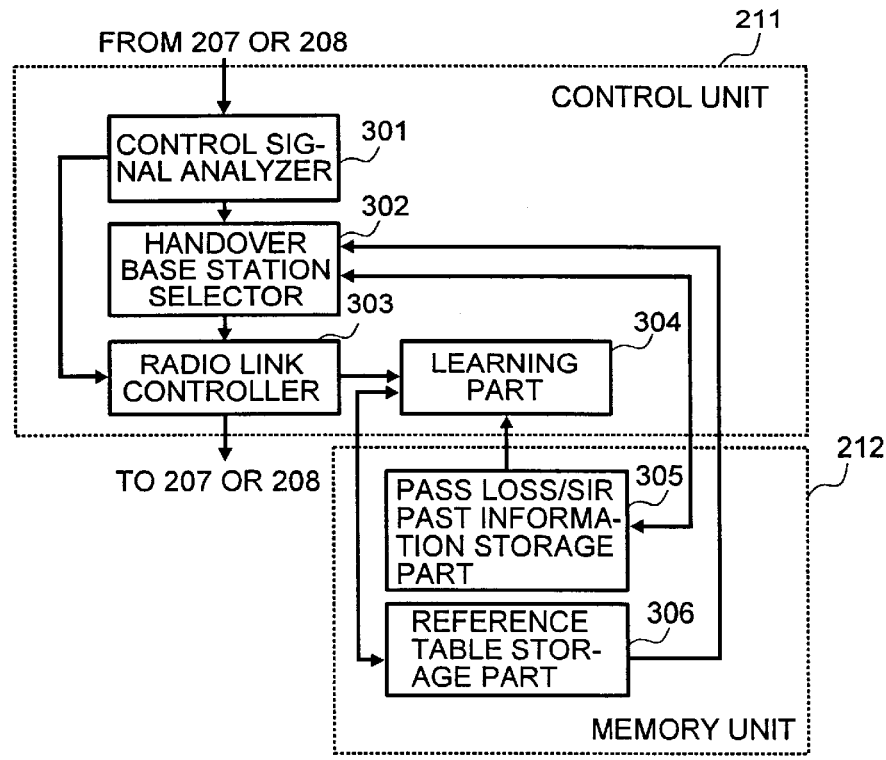
FIG. 3A shows configurations of a control unit and a memory unit provided within the base station controller.

FIG. 3A shows configurations of portions lying within the control unit and memory unit of the base station controller, which are related to the form of the invention of the present application. A control signal analyzer 301 is a circuit for analyzing the contents of a control signal for calling control, which is received from a mobile station, base station or switcher. A handover base station selector 302 is a circuit for comparing the status of communications of the mobile station and each reference table, determining whether the mobile station needs a handover operation and selecting a more suitable handover-destined base station. A radio link controller 303 is a circuit for performing the transfer of a control signal for establishing and maintaining the optimum radio status to and from the base station or mobile station. A learning part 304 is a circuit for updating each reference table stored in a reference table storage part 306 to be described later according to the status of execution of a handover operation. Incidentally, the circuits 301 through 304 may be comprised of software. A pass loss/SIR past information storage part 305 is a memory for storing pass losses of channels at which received levels are to be measured in advance, and SIR of each of the channels as time-sequential data therein. A reference table storage part 306 is a memory for storing therein reference tables used upon selection of a base station for a handover candidate. Post-learning pass losses, SIR and handover-destined base stations are stored in each reference table. Further, a pass loss/transmitter power level past information storage part 307 is a memory for storing therein pass losses of channels at which received levels are to be measured in advance, and base-station transmitter power levels for the channels as time-sequential data. A reference table storage part 308 is a memory for storing therein reference tables used upon selection of a base station for a handover candidate. Post-learning pass losses, transmitter power levels and handover-destined base stations are stored in each reference table. A pass loss/FER past information storage part 309 is a memory, which stores therein pass losses of channels intended for the measurement of received levels from each individual base stations to a mobile station being in communication, and a frame error rate of a communication channel employed in each base station as time-sequential data. The communication channel principally means a traffic channel but may be another channel if one capable of measuring the quality of a communication line is used. A reference table storage part 310 is a memory for storing therein each reference table compared with the time-sequential data stored in the pass loss/FER past information storage part 309 upon selection of the base station for the handover candidate.

The operations of the base stations 102 through 104 and base station controller 101 shown in FIG. 2 will first be described. The base stations 102 through 104 respectively transmit pilot channels used as indexes for soft handover and power control through the use of the transmit/receive shared units 201. Incidentally, the pilot channel might be also called by another name such as a perch channel according to the difference in standard specification. The base station 102 being connected to the mobile station 105 transmits user information such as voice, data through the use of a traffic channel. The mobile station 105 having received the corresponding pilot channel measures signal quality such as its pass loss, SIR or the like and reports the result of measurement to the base station controller 101 through the base station 102 in connection. Incidentally, the mobile station 105 receives even pilot channels of the non-connected base stations 103 and 104 as well as that of the base station 102 now in connection and reports their signal quality to the base station controller 101. Further, the base station 102 in connection receives an uplink traffic channel from the mobile station 105, measures its signal quality, and reports the result of measurement thereof to the base station controller 101. While the signal quality is defined as FER in the present embodiment, another signal quality such as BER may be used.

The operations of the base station and base station controller will now be described in little more details. A signal sent from the mobile station 105 is received by the transmit/receive shared unit 201 of the base station 102. After the signal has passed through the modulator-demodulator unit 203, it is transmitted to the base station controller 101 through the base station controller IF 204. The signal sent to the base station controller 101 is received through the base station IF 208 and sent to the control unit 211 provided within the base station controller 101 through the diversity handover unit. The transmission of a downlink signal from the base station controller 101 to the mobile station 105 results in the inverse of the above-described path. Instructions issued from the base station controller 101 to the base stations 102 through 104 are transmitted from the control unit 211 and reaches the control units 207 provided within the base stations 102 through 104 through the base station IF 208 and bas station controller IF 204. The transmission of the signals from the base stations 102 through 104 to the base station controller 101 results in the inverse of the above-described path. In the control unit 211 in the base station controller 101, the control signal analyzer 301 determines the type of each of the control signals transmitted from the mobile station 105 and base stations 102 through 104. When the control signals are regarded as reports such as pass losses and SIR transmitted from the mobile station 105, of channels for the measurement of received levels from the already-connected base station 102 and non-connected peripheral base stations 103 and 104, the handover base station selector 302 starts up a handover process. The radio link controller 303 transmits a request for addition to handover or deletion from handover to the base station 103 selected by the handover base station selector 302 and the corresponding mobile station 105. When the handover addition or deletion is carried out, the learning part 304 updates reference data by using the result thereof and past information about pass losses and SIR. Specific handover processes will be disclosed below.

(1) Handover Adding Process

Figure 4:
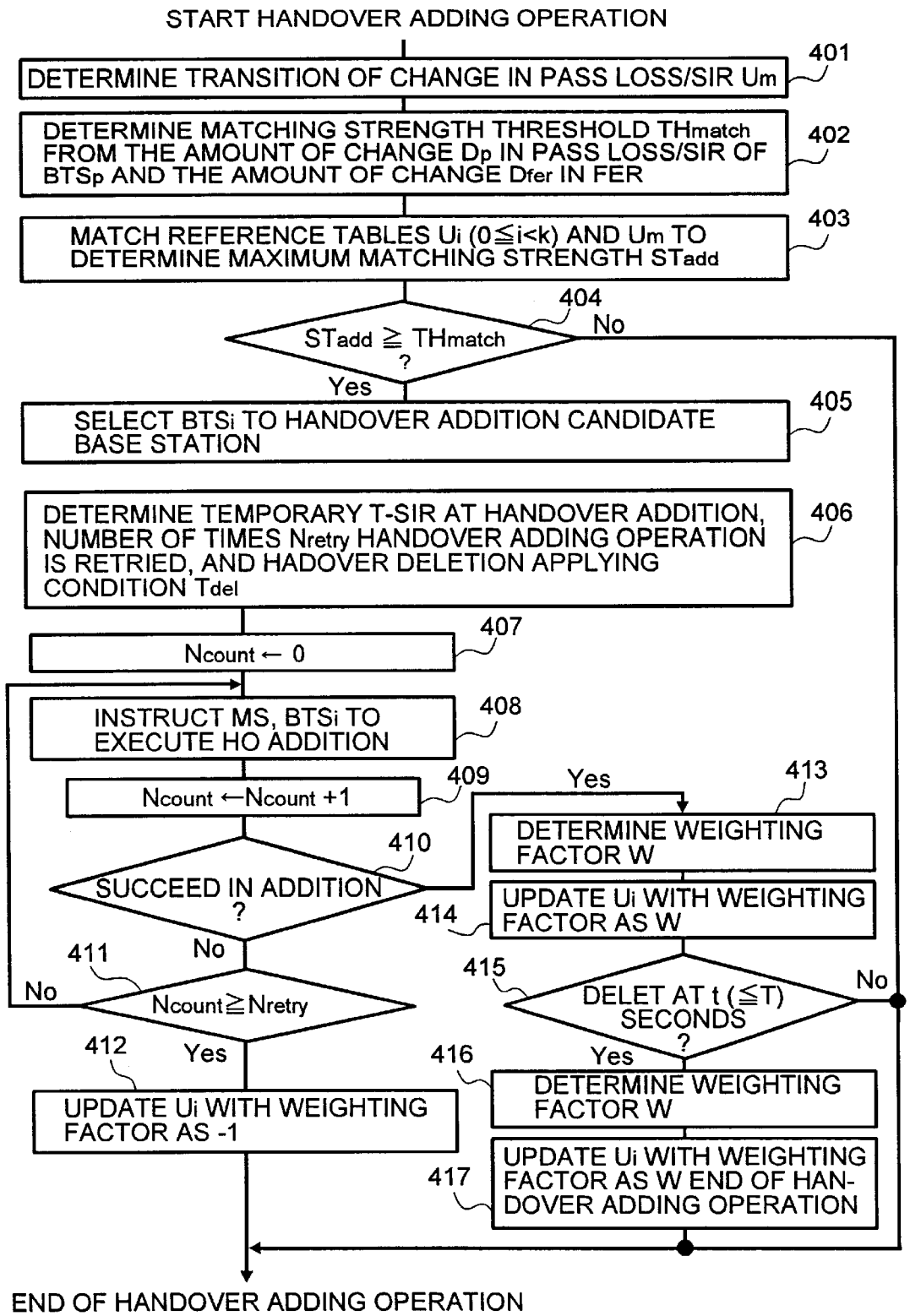
FIG. 4 illustrates a handover adding process.

FIG. 4 shows a flowchart for describing a handover adding operation of a control unit. In the present embodiment, the base station controller 101 selects a suitable additional candidate, based on each of matching-orientated tables and each of reference tables to thereby control unnecessary handover adding operations. Here, the matching-orientated table means a table reported from the mobile station 105, in which transitions of changes in pass loss and SIR about the already-connected base station and non-connected peripheral base stations 103 and 104 are stored. On the other hand, the reference table indicates a table in which transitions of changes in pass loss and SIR and results of learning of bases stations destined for handover addition are stored. Further, the additional candidate indicates a candidate of a base station to be added to handover.

Incidentally, suffixes m, p, p' are used for purposes of generalized illustration. m is a number indicative of a mobile station in communication. p is a number indicative of each base station being in communication with the mobile station. p' is a number indicative of each base station non-connected to the mobile station. A mobile station m(105) creates $L_m(t)$ indicative of signal quality at a time t by means of a control unit thereof and transmits the created $L_m(t)$ to the connected base station 102. $L_m(t)$ includes a pass loss ($l_{m,p}(t)$) and SIR ($S_{m,p}(t)$) of a pilot channel transmitted from a connected base station p(102), and a pass loss ($l_{m,p'}(t)$) and SIR ($S_{m,p'}(t)$) of a pilot channel transmitted from each of non-connected base stations p' (103 and 104). Described more specifically, $L_m(t)=[(l_{m,p}(t), S_{m,p}(t)), (l_{mp'}(t), S_{m,p'}(t)), \ldots]$. Incidentally, the mobile station 105 may adopt channels other than the pilot channels as objects for the measurement of received levels. While the base station 102 receives $L_m(t)$ therein, it measures FER ($Fer_{m,p}(t)$) of an uplink traffic channel and transmits $L_m(t)$ and $Fer_{m,p}(t)$ to the corresponding base station controller.

The handover base station selector 302 receives $L_m(t)$ and $Fer_{m,p}(t)$ through the control signal analyzer 301. The control unit 211 determines the transition of a change in $L_m(t)$ from the received signal quality information $L_m(t)$ to thereby create a matching-orientated table $U_m$1701 indicative of the transition of a change in received quality and stores it in the pass loss/SIR past information storage part 305. Incidentally, $U_m$ will be expressed as $U_m=u[L_m(t-n),L_m(t)]$.

FIG. 16 shows an example of the matching-orientated table $U_m$. Information about pass losses and SIR of pilot channels extracted from $L_m(t)$, and FER($Fer_{m,p}(t)$) of an uplink traffic channel measured by the connected base station 102 are stored in $U_m$1701 as time-sequential data at times t−n to t. In the present example, the pass loss $l_{m,102}(t)$ of the base station 102 is given as 10 and SIR ($S_{m,102}(t)$) thereof is stored as 12. Incidentally, $Fer_{m,102}(t)$ is given as 30. In the example shown in FIG. 16, the base station 102 is set as the connected base station p, and the base stations 103 and 104 result in non-connected base stations p'. When a mobile station is already connected to a plurality of base stations, a plurality of connected base stations p exist. At this time, however, the connected base stations brought to the minimum pass loss or maximum SIR will be defined as p. A plurality of base stations each having a threshold or greater or a few upper stations good in quality may be defined as p.

After the matching-oriented table and the reference table are matched with each other, a matching strength threshold is updated based on the amount of change in FER of the traffic channel. Since the matching strength threshold is one which has taken into consideration communication quality of each connected base station, it is effective in exerting control on an unnecessary handover adding operation.

In Step 401, the handover base station selector 302 first refers to a matching-orientated table $U_m$. In Step 402, the handover base station selector 302 calculates the amount of change $D_p$ in $L_{m,p}(t)$ of a connected base station $BTS_p$ within a unit time n (time t−n to t), and the amount of change $D_{fer}$ in FER of the traffic channel from the following equations:

$$D_p = d[L_{m,p}(t-n), L_{m,p}(t)]$$
$$= L_{m,p}(t) + |L_{m,p}(t) - L_{m,p}(t-n)|/n$$
$$= (l_{m,p}(t) + |l_{m,p}(t) - l_{m,p}(t-n)|/n)$$

$$D_{fer} = d[Fer_{m,p}(t-n), Fer_{m,p}(t)]$$
$$= Fer_{m,p}(t) + (Fer_{m,p}(t) - Fer_{m,p}(t-n))/n$$

When the time interval n is defined as 10 in the table shown in FIG. 16, for example, $D_p$ results in (10+(10−2)/10)=10.8 and $D_{fer}$ is determined as (30+(30−0/10)=33.3. The handover base station selector 302 determines a matching strength threshold $TH_{match}$=thre ($D_p,D_{fer}$) by using $D_p$ and $D_{fer}$ referred to above. The matching strength threshold is a value used as an index upon adding a handover base station. The thre( ) is a function for determining $TH_{match}$ from $D_p$ and $D_{fer}$. The thre( ) may be a function having the following feature. As to the thre( ), $TH_{match}$ may preferably be set high relatively when the amount of change $D_p$ in pass loss and SIR and the amount of change $D_{fer}$ in FER are small. This is because when the state of a connected communication channel is stable and the communication channel is high in quality, it is capable of sufficiently communication even without daringly performing handover. On the other hand, when the amount of change $D_p$ in pass loss and SIR and the amount of change $D_{fer}$ in FER are large, $TH_{match}$ may preferably be set low relatively as the thre( ). This is done to make it easy to perform the handover adding operation when the state of a connected communication channel is unstable and the quality of communications is degraded. Incidentally, when FER is suddenly degraded, $TH_{match}$ is relatively set low in consideration of even the transition of change in FER of each connected base station. If done in this way, then the base stations result in handover adding candidate base stations even if the matching strength is strong. Therefore, the mobile station can be connected to a plurality of base stations in a stage faster than as usual.

Figure 6:
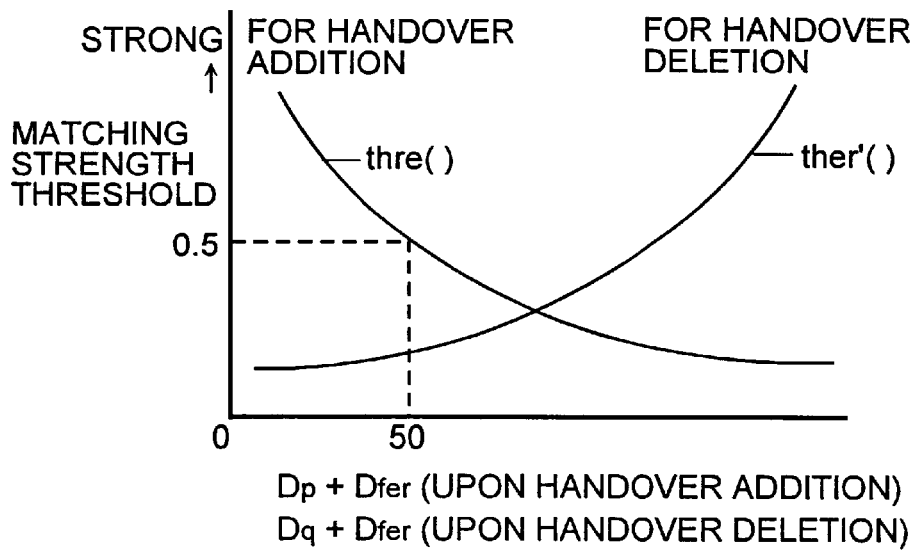
FIG. 6 is a graph for determining matching strength thresholds for handover addition/deletion.

One example of a method of determining $TH_{match}$ referred to above is shown in a graph of FIG. 6. In FIG. 6, the state of each connected communication channel is determined from the sum of $D_p$ and $D_{fer}$ to thereby determine $TH_{match}$. If $TH_{match}$ is actually determined from FIGS. 16 and 6, then the amount of change $D_p$ in pass loss and SIR and the amount of change $D_{fer}$ in FER become 10.8 and 33.3 respectively and hence $TH_{match}$ results in $TH_{match}$=thre (10.8,33.3)=about 0.5.

In Step 403, the handover base station selector 302 successively compares a plurality of reference tables $U_i$ and matching-orientated tables $U_m$ to determine their matching strengths $ST_i$ and determines the maximum matching strength $ST_{add}$ of them. This is because if sufficient learning has already been performed, the optimum handover candidate would be obtained as one maximum in matching strength, of a plurality of past handover destinations. The handover base station selector 302 refers to the reference tables $U_i=[U_i(0),U_i(1), \ldots ,U_i(n)](0\leq i<k$: where k indicates the number of reference tables for handover addition). The tables $U_i$ are pre-learned time-sequential data about pass losses and SIR of channels for the measurement of received levels at a mobile station and are stored in the reference table storage part 306 of the memory unit 212. $U_i(0)$ through $U_i(n)$ indicate respective components at times 0 through n of the reference tables $U_i$ respectively. An example illustrative of the tables $U_i$ is shown in FIG. 19. In FIG. 19, $U_o$ is expressed as $[(1,20,10,6,8,8),(1,18,10,8,7,7) \ldots (8,5,2,19,9,6)]$.

The maximum matching strength $ST_{add}$ is next calculated. In order to calculate $ST_{add}$, it is necessary to match $U_m$ and a plurality of $U_i$ with one another respectively and determine their matching strengths $ST_i$. Examples of methods of matching $U_i$ with $U_m$ will now be introduced. One example is a method of firstly extracting a base station registered in $U_m$, selecting $U_i$ in which each base station extracted from a plurality of reference tables is registered, and matching them with each other. Another example is a method of firstly normalizing a table size so that $U_m$ coincides with the number of base stations registered in tables of $U_i$ and matching $U_m$ with $U_i$.

The matching strengths $ST_i$ between $U_m$ and $U_i$ ($0 \leq i < k$) can be obtained from the following equation:

$ST_i$=−(difference at a time 0+difference at a time 1+ . . . +difference at a time $n$)/$n$ Thus, the matching strengths $ST_i$ between $U_m$ and k $U_i$ are respectively determined, and one having the maximum value of the k $ST_i$ will be defined as $ST_{add}$. Incidentally, when a plurality of base stations are added simultaneously, those each having a threshold or higher or several upper stations good in quality may be selected.

In Step 404, the handover base station selector 302 makes a decision as to whether $ST_{add}$ is greater than or equal to $TH_{match}$. If $ST_{add}$ is found to be greater than or equal to $TH_{match}$, then the handover base station selector 302 proceeds to Step 405. In Step 405, the handover base station selector 302 selects an addition-destined base station $BTS_i$ in an ith reference table chosen as $ST_{add}$, as an additional candidate. In the previously-determined example, $TH_{match}$ is set as 0.5. Assuming that the matching strength $ST_D$ between $U_m$ and $U_0$, of the previously-determined $ST_i$ is maximum and $ST_0$=0.7, BTS103 recorded in $U_i$ is selected as an additional candidate to meet the condition of $ST_{add} > TH_{match}$.

Next, in Step 406, the base station controller determines the difference in pass loss and SIR between a connected base station p and an additional candidate base station i and determines a target SIR at the addition of handover, the number of retries at a handover adding operation and handover deletion/addition conditions according to the difference. In the present embodiment, unnecessary deletions are lessened by varying the above-described target SIR, number of retries and addition conditions according to the status of communications.

Here, the term target SIR indicates an index of reception quality to be met when an uplink signal transmitted from a mobile station m is received by its corresponding base station.

Further, the addition conditions used upon handover deletion may include a handover addition hysteresis, a grace time interval and the number of graces. The handover addition hysteresis is a kind of threshold and corresponds to one in which when the time between adding a given base station to handover and next bringing it to a deletion candidate does not exceed the threshold, the deletion from the handover is not recognized. The grace time interval corresponds to a time interval required to allow of deletion even if a matching strength threshold falls short of a deleted threshold continuously for a predetermined time interval. Namely, the base station becomes a deleted candidate only when the time interval having fallen short of the threshold continuously exceeds the grace time interval. The number of graces corresponds to the number of times in which the deletion is allowed even if the matching strength threshold falls short of a handover deletion threshold within a unit time several times. Namely, it would become a deleted candidate only when having exceeded the number of grades referred to above. Owing to these, the base station added to the handover is set so as not to be deleted from the handover immediately after the addition thereof.

The radio link controller 303 calculates the difference between $L_{m,i}(t)$ about an added candidate base station i(103) and $L_{m,p}(t)$ about a base station p(102) connected now and placed during communications, of $L_m(t)$ reported from a mobile station m(105). The radio link controller 303 determines ΔT-SIR from the difference. ΔT-SIR is a value for temporarily increasing T-SIR corresponding to the present target SIR upon the handover adding operation.

$$\Delta T - SIR = Sir(L_{m,i}(t) - L_{m,p}(t))$$
$$= Sir(l_{m,i}(t) - l_{m,p}(t))$$

Further, a number-of-retries upper limit value $N_{retry}$ at the time of a failure in handover adding operation is determined from the difference.

$$N_{retry} = Retry(L_{m,i}(t) - L_{m,p}(t))$$
$$= Retry(l_{m,i}(t) - l_{m,p}(t))$$

where Sir( ) and Retry( ) are functions for determining ΔT-SIR and $N_{retry}$ from the difference between $L_{m,i}(t)$ and $L_{m,p}(t)$, respectively. When the difference between $L_{m,i}(t)$ and $L_{m,p}(t)$ is large, it is desirable that ΔT-SIR is made great to increase the output of the mobile station a little bit and the number of retries $N_{retry}$ is also increased. This is because since the distance between the mobile station and the handover additional candidate base station i is considered to increase when the difference between $L_{m,i}(t)$ and $L_{m,p}(t)$ is large, a transmitter power level increases to make it easy to succeed in handover and it is necessary to make retries several times even if the handover adding operation ends in failure. Since the distance between the mobile station and the additional candidate base station i decreases when the difference between $L_{m,i}(t)$ and $L_{m,p}(t)$ is determined to be small in reverse, it can be said that this would become a situation easy to succeed in handover adding operation. It is thus desirable that ΔT-SIR is reduced to avoid the consumption of resources and $N_{retry}$ is reduced so that even the number of retries at the time of the failure in handover adding operation is decreased. When the difference between $L_{m,i}(t)$ and $L_{m,p}(t)$ is large, it can be also said that the handover additional candidate base station i is easy to become a handover deletion candidate after the addition of handover.

Figure 7:
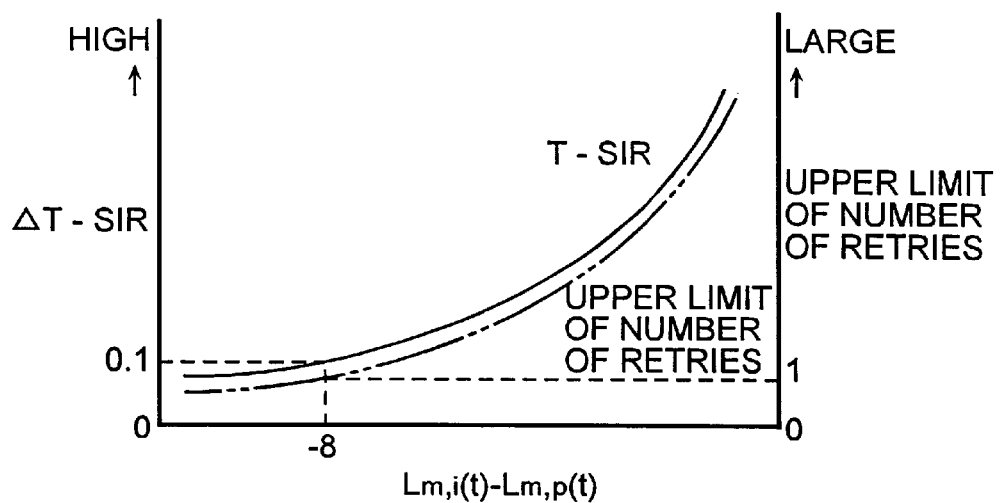
FIG. 7 is a graph for determining ΔT-SIR and number-of-retries upper-limit values.

FIG. 7 shows one example of a method of determining respective conditions. Determining both from the example shown in FIG. 16 yields ΔT-SIR=Sir($L_{m,i}(t)$−$L_{m,p}(t)$)=Sir(2−10)=Sir(−8)=0.1 and $N_{retry}$=Retry($l_{m,i}(t)$−$l_{m,p}(t)$)=Retry(2−10)=Retry(−8)=1.

Further, the radio link controller 303 determines a hysteresis $T_{del}$ for defining the connection of a base station i(103) thereto as a deleted candidate after the completion of the handover adding operation from the difference between $L_{m,i}(t)$ and $L_{m,p}(t)$. $T_{del}$ may preferably be set longer as the difference between $L_{m,i}(t)$ and $L_{m,p}(t)$ becomes large, in order to prevent the repetition of a process for adding handover or a process for deleting it.

In Step 407, the radio link controller 303 initializes a counter $N_{count}$ for counting the number of times that the handover adding operation is retried. In Step 408, the radio link controller 303 instructs the mobile station m and the handover additional candidate base station $BTS_i$ to execute the handover adding operation. In Step 409, the radio link controller 303 counts up the value of $N_{count}$.

After the handover addition executing instructions have been made in Steps 407 through 409, the radio link controller 303 makes a decision as to the result of the handover adding operation in Step 410. If the handover adding operation succeeds at the mobile station m and the handover additional candidate base station i, then the radio link controller 303 proceeds to Step 413. If the handover adding operation has failed at the mobile station m or the base station i, then the radio link controller 303 proceeds to Step 411. If the retry counter $N_{count}$ reaches greater than or equal to the number-of-retries upper limit value $N_{retry}$ at this time, then the radio link controller 303 proceeds to Step 412 for the learning part 304. If less than or equal to $N_{retry}$, then the radio link controller 303 returns to Step 408, from which the handover adding operation is repeated.

Next, in the present embodiment, when the handover adding operation has failed, the reference tables $U_i$ are updated so that the corresponding base station becomes hard to do the handover adding operation in the case of the transition of a change in pass loss/SIR at its failure. On the other hand, when the handover adding operation has succeeded, the reference tables $U_i$ are updated so that the corresponding base station becomes easy to do the handover adding operation as the number of retries at that time decreases. A weighting factor W is used for updating. Incidentally, W assumes the value between $-1 \leq W \leq 1$. The values of respective components $U_i(0)$ through $U_i(n)$ of each reference table $U_i$ are updated so that the base station i failed in addition becomes hard to be next taken as an additional candidate, as W takes a negative large value. On the other hand, as W takes a positive large value, the values thereof are updated so that the base station i is easy to become an additional candidate.

When the handover adding operation is found to have failed in Step 410, the radio link controller 303 proceeds to Step 411. When $N_{count}$ reaches a value greater than or equal to $N_{retry}$ in Step 411, it means the exceeding of the limit of a failure. Therefore, the learning part 304 multiplies the difference $[L_m(t-n)-U_i(0), L_m(t-n+1)-U_i(1), \ldots, L_m(t)-U_0(n)]$ between $U_m$ and $U_i$ by $-1$ as the weighting factor W in Step 412 and updates $U_i=[U_i(0), U_i(1), \ldots, U_i(n)]$ next time so as to avoid an additional candidate. An example of calculations thereof will now be explained. If $U_0$ is defined as a pre-updating value and $U_0'$ is defined as a post-updating value, then the calculation is performed as in the case of $U_0'=[U_0'(0), U_0'(1), \ldots, U_0'(n)]=[U_0(0)+(-1\times(L_m(t-n)-U_0(0)), \ldots, U_0(n)+(-1\times(L_m(t)-U_0(n)))]$. In the examples shown in FIGS. 16 and 19, $U_0'(0)$ is updated as $U_0'(0)=[(1-(2-1)), (20-(20-20)), (10-(10-10)), (6-(6-6)), (8-(7-8)), (8-(7-8))]=[0,20,10,6,9,9]$. When this is done until $U_0(0)$ through $U_0(n)$, the updating of the reference table $U_0$ is completed.

When the handover adding operation is found to have succeeded in Step 410, the learning part 304 sets the weighting factor W as a large value as the number of the retries decreases in Step 413. When the weighting factor W is determined in this way, the reference table is updated so that the corresponding base station at $U_m$ is easy to become an additional candidate as the number of the retries decreases.

In Step 414, the learning part 304 multiplies the difference between $U_m$ and $U_i$ by W to thereby update the values of $U_i(0)$ through $U_i(n)$ of $U_i$. Assuming that as a result of selection of BTS103 as an additional candidate base station from the reference table $U_0$ and a trial of the handover adding operation in the previous example, the handover adding operation has succeeded at $N_{count}=1$ and W=Weight $(1)=0.8$, the reference table $U_0$ is updated as $U_0'=[U_0'(0), U_0'(1), \ldots, U_0'(n)]=[U_0(0)+(-0.8\times(L_m(t-n)-U_0(0)), \ldots, U_0(n)+(-0.8\times(L_m(t)-U_0(n)))]$. In the examples shown in FIGS. 16 and 19, $U_0$ is updated as in the case of $U_0'(0)=[(1+0.8\times(2-1)), (20+0.8\times(20-20)), (10+0.8\times(10-10)), (6+0.8\times(6-6)), (8+0.8\times(7-8)), (8+0.8\times(7-8))]=[1.8,20,10,6,7.2,7.2]$. When this is done until $U_0(0)$ through $U_0(n)$, the renewal of the reference table $U_0$ is completed.

Next, in the present embodiment, when each base station added by handover is deleted in a short time after the addition thereof, the reference tables $U_i$ are updated so that the base station is not added in the case of the transition of a change in pass loss and SIR at that time. Thus, the repetition of unnecessary handover adding and deleting operations is controlled.

When the radio link controller 303 detects in Step 415 that the base station i is brought to a handover deleted or deletion candidate in t (where $t \leq T$: where T indicates upper-limit time required to monitor the deleting operation) seconds after the handover adding operation has succeeded, the learning part 304 determines a weighting factor $-W$ in Step 416 so that the weighting factor $-W$ becomes a negative large value as the time t becomes short. By determining the weighting factor $-W$ in this way, the reference tables $U_i$ are updated so that the corresponding base station is hard to become an additional candidate as the time t becomes short. In Step 417, the learning part 304 multiplies the difference between $U_m$ and $U_i$ by the weighting factor $-W$ to thereby update the reference tables $U_i$.

(2) Handover Deleting Process

Figure 5:
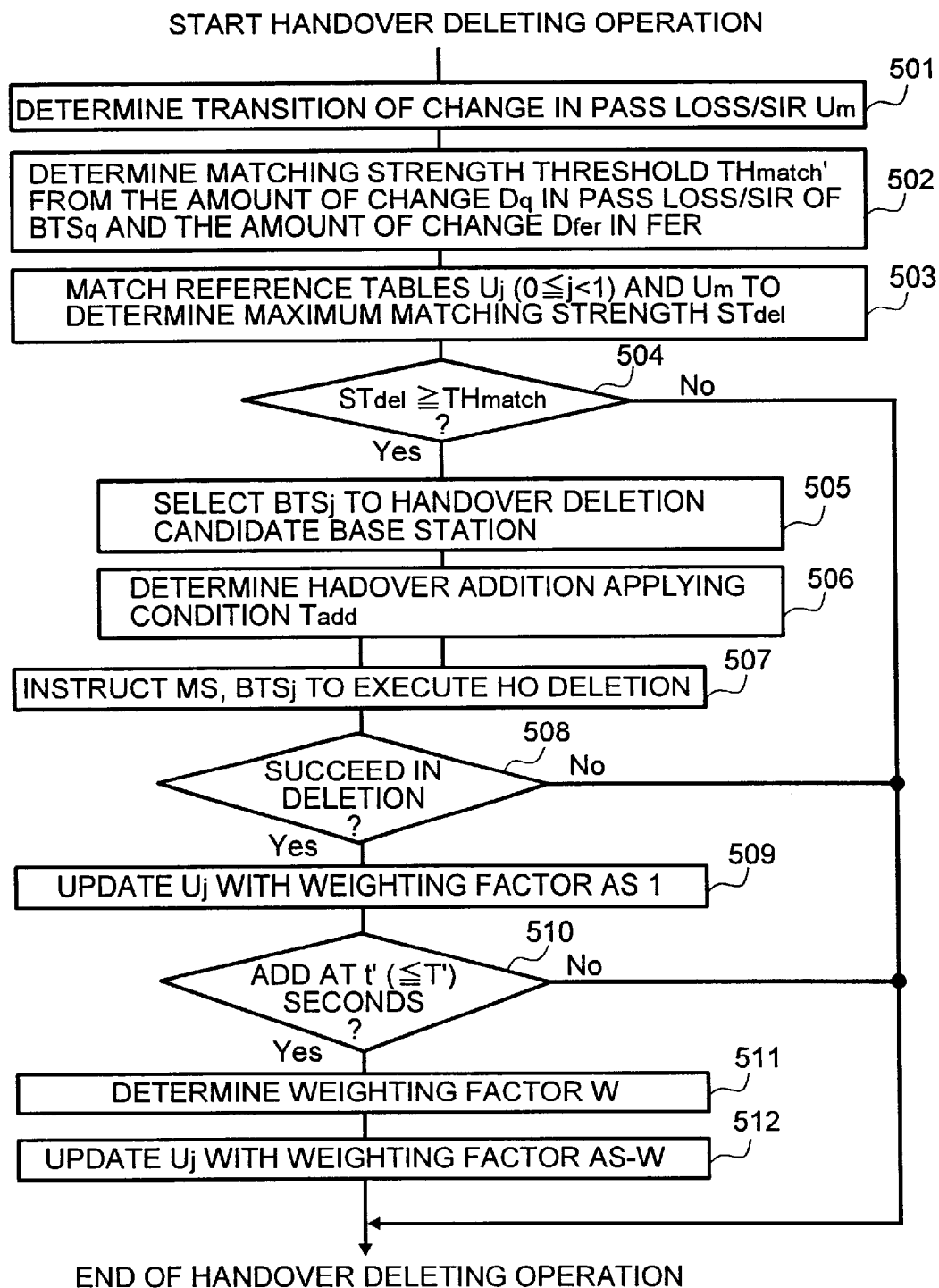
FIG. 5 depicts a handover deleting process.

FIG. 5 shows a flowchart for describing a handover deleting process.

The base station controller 101 learns the result of the handover deleting process in a manner similar to the method of selecting the candidate for each base station to be added to the handover. A base station regarded as a deleted candidate from handover is selected based on the learned reference table, whereby the repetition of deleting and adding processes is avoided and needless use of radio resources is controlled.

The handover base station selector 302 receives a report $L_m(t)$ about pass losses and SIR from the mobile station m through the control signal analyzer 301. In Step 501, the handover base station selector 302 refers to the pass loss/SIR past information storage part 305 to thereby obtain $U_m=u[L_m(t-n), L_m(t)]$ indicative of the transition of a change in $L_m(t)$. FIG. 16 shows an example of a matching-orientated table $U_m$.

In the present embodiment, a matching strength threshold is varied based on pass losses, SIR and FER of a base station brought to the minimum pass loss or maximum SIR, of connected base stations in order to control unnecessary deleting operations.

In Step 502, the handover base station selector 302 selects a base station q (where q: natural number) brought to the minimum pass loss or maximum SIR, of connected based stations in $L_m(t)$ and calculates the amount of change $D_q=d[L_{m,q}(t-n), L_{m,q}(t)]$ in values $L_{m,q}(t)$ of a pass loss and SIR of the base station q, per unit time (time t-n to t). Further, the handover base station selector 302 calculates the amount of change $D_{fer}=d[Fer_{m,q}(t-n), Fer_{m,q}(t)]$ in FER with respect to a mobile station m, which has been measured by the base station q. In the example of FIG. 16, BTS102 is defined as the base station q. The handover base station selector 302 determines a matching strength threshold $TH_{match}'=thre'(D_q, D_{fer})$ used upon execution of matching with handover deleting reference data through the use of $D_q$ and $D_{fer}$. Here, thre'( ) is a function for determining the matching strength threshold $TH_{match}'$ for handover deletion from $D_q$ and $D_{fer}$. One example of a method of determining $TH_{match}'$ is shown in a graph of FIG. 6. The drawing shows that thre'( ) meets the following features. Namely, when the amount of change in pass loss and SIR $D_q$ and the amount of change in FER $D_{fer}$ are small, thre'( ) provides a relatively low value as $TH_{match}'$. This is because when each connected communication channel is stable in state and high in quality, a connection to unnecessary base stations becomes easy to be released. When the amount of change in pass loss and SIR $D_q$ and the amount of change in FER $D_{fer}$ are great in reverse, i.e., when the state of each connected communication channel is unstable and communication quality is degraded, thre'( ) provides a relatively high value as $TH_{match}'$ so that a connection to a plurality of base stations becomes hard to be set free.

In Step 503, the handover base station selector 302 refers to reference tables $U_j$ ($0 \leq j < 1$: where l indicates the number of reference tables for handover deletion) in which respective transitions of changes in pass loss and SIR of channels intended for the measurement of received levels and handover deletion-destined base stations have been written. The handover base station selector 302 matches $U_j$ and $U_m$ with one another to calculate the maximum matching strength $ST_{del}$. Incidentally, when a plurality of base stations are deleted simultaneously, a plurality of base stations each having one exceeding a threshold or poor in quality may be selected. An embodiment illustrative of $U_j$ tables is shown in FIG. 20. Pass losses and SIR reported from mobile stations are stored in the tables as learned time-sequential data. $U_j$ are stored in the reference table storage part 306. Two examples illustrative of methods of matching $U_j$ with $U_m$ will now be introduced. One example is a method of extracting a base station registered in the tables of $U_m$ in FIG. 16, selecting a table in which each extracted base station is registered, out of a plurality of $U_j$ tables, and matching $U_j$ and $U_m$ with each other. Another example is a method of normalizing a table size so that $U_m$ tables coincide with the number of base stations registered in the tables of $U_j$ and matching $U_m$ with the plurality of $U_j$.

In Step 504, the handover base station selector 302 makes a decision as to whether the maximum matching strength $ST_{del}$ is greater than or equal to a matching strength threshold $TH_{match}'$. If $ST_{del}$ is found to be grater than or equal to the matching strength, then the handover base station selector 302 proceeds to Step 505, where it selects a deletion-destined base station j written in a jth handover deleting reference table as a deleted candidate.

In Step 506, the radio link controller 303 calculates the difference between a value $L_{m,j}(t)$ from the handover deletion-destined candidate base station j and a value $L_{m,q}(t)$ from a base station $BTS_q$ assuming the minimum pass loss or maximum SIR, of base stations being now connected and in communication, both of which are selected out of reports $L_m(t)$ about pass losses and SIR of channels for the measurement of received levels, which have been reported from a mobile station m. In the present embodiment, the base station controller updates a handover deletion hysteresis or handover addition applying condition, based on the differences between pass losses and SIR of a handover deletion candidate base station and pass losses and SIR of each connected base station brought to the minimum pass loss or maximum SIR. The hysteresis indicates a grace time for avoiding the treatment of each base station deleted from handover as a handover additional candidate soon again. The handover addition applying condition corresponds to a condition for setting a base station j as an additional candidate again after having been deleted from handover. This indicates the number of times that a matching strength exceeds a handover addition threshold within a unit time or a time interval during which the matching strength exceeds a threshold continuously. Owing to these, the handover deletion and re-addition erroneously carried out when the quality of communications with each connected base station is good, are prevented.

It is desirable that in order to prevent the repetition of the handover deleting/adding operation, a handover addition applying condition $T_{add}$ is set long as the difference between $L_{m,q}(t)$ and $L_{m,j}(t)$ becomes small. This is because when the difference between $L_{m,q}(t)$ and $L_{m,j}(t)$ is small, a handover deletion candidate base station j is apt to become an additional candidate immediately after its deletion and the unnecessary repetition of the deleting and adding operations might occur.

In Step 507, the radio link controller 303 instructs the mobile station m and handover deletion candidate base station j to execute the deleting process from the handover. The thus-instructed mobile station m and base station j performs the handover deleting process.

In Step 508, the radio link controller 303 makes a decision as to the result of the handover deleting operation. If the handover deleting operation succeeds at the mobile station m and the handover deletion candidate base station J, then the radio link controller 303 proceeds to Step 509. The learning part 304 multiplies the difference between $U_m$ and $U_j$ by 1 as a weighting factor W' to update the handover deleting reference table $U_j$. The weighting factor at this time takes a value between $-1 \leq W' \leq 1$. The learning part 304 updates the corresponding reference table so that the base station j becomes hard to be a deleted candidate as the weighting factor W' takes a negative large value. On the one hand, the learning part 304 updates the corresponding reference table so that as the weighting factor W' takes a positive large value, the base station j is easy to become a deleted candidate.

Steps 510 through 512 are steps for controlling the unnecessary repetition of the deleting and adding processes when a given base station becomes an addition candidate immediately after its deletion. When the radio link controller 303 first detects in Step 510 that a base station $BTS_j$ has been brought to a handover addition candidate in t' ($\leq T$: T': adding operation monitoring upper-limit time) seconds after the base station $BTS_j$ has succeeded the handover deleting operation, it proceeds to Step 511. The radio link controller 303 determines a weighting factor $-W'$ so that the weighting factor $-W'$ becomes a negative large value as the time t' becomes short. In Step 512, the learning part 304 multiplies the difference between $U_m$ and $U_j$ by the weighting factor $-W'$ to update the reference table $U_j$.

Figure 8:
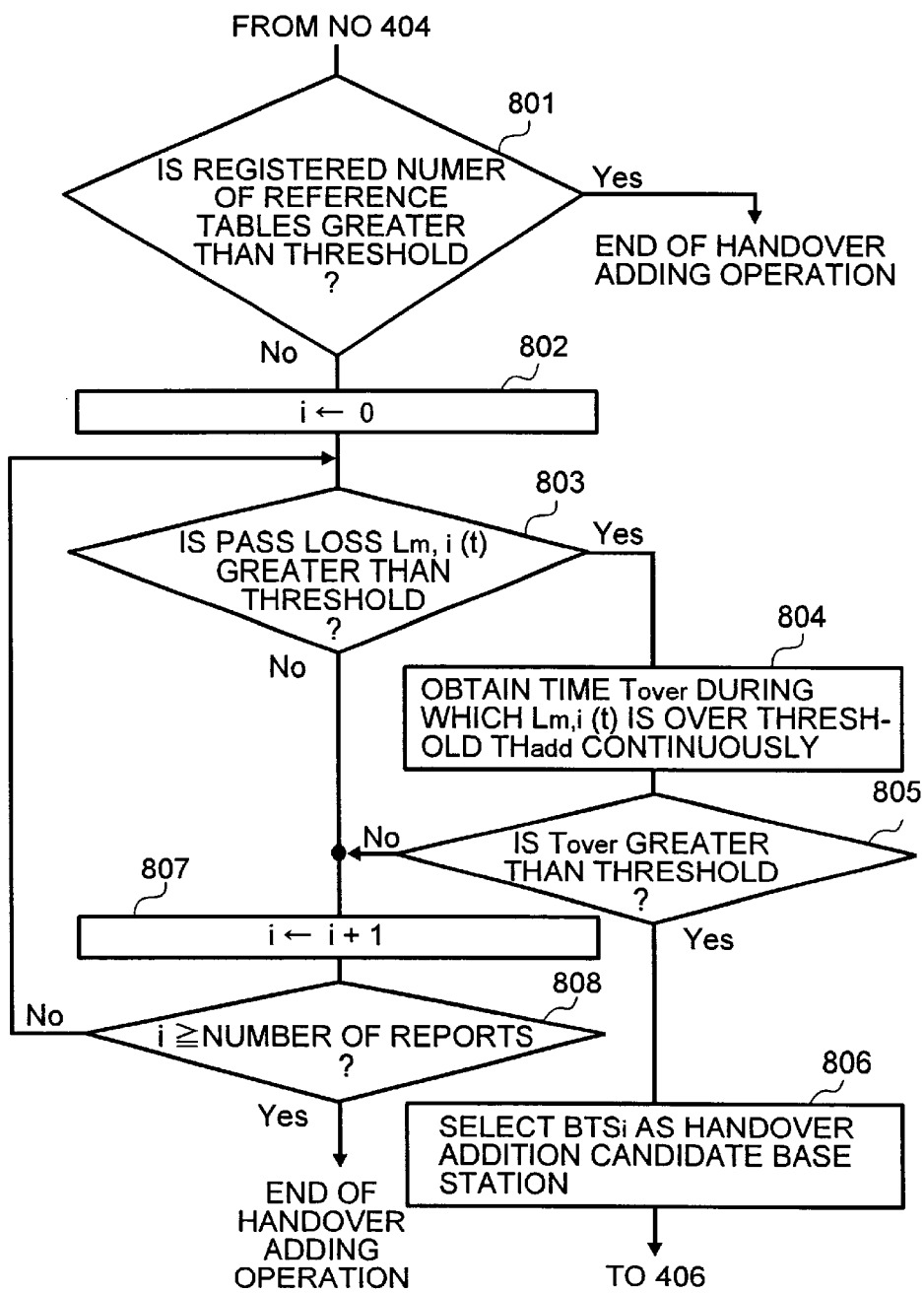
FIG. 8 shows a handover adding method at system boot-up.

(3) Handover adding process at the beginning of system boot-up:

FIG. 8 shows a handover adding process at the beginning of system boot-up.

The memory unit 212 at the beginning of system boot-up does not register therein reference tables corresponding to the number enough to carry out the aforementioned embodiment. As a result, the matching strength becomes less than the matching strength threshold, thus causing the events that handover cannot be suitably carried out. Although data may be collected in advance before the provision of service, a human investment cannot be neglected either as well as expenditures of a long time upon collection of sufficient data. Enterprisers for provision of service desire to avoid such waste if practicable.

Thus, in the present embodiment, the learning-type first handover mode described up to now and a second handover mode used for the system boot-up are used by switching. Owing to their use, more suitable handover is provided even in the case of the beginning of the system boot-up.

In the second handover mode, pass losses and SIR of each non-connected base station are first respectively compared with a fixed handover additional threshold. If a base station having one sufficiently exceeding the threshold exists, then the base station is added to handover. After the execution of handover based on the fixed threshold, the transition of a change in pass loss and SIR at this time is then multiplied by a weighting factor corresponding to the success/failure of the execution of handover, which in turn is newly registered in the corresponding reference table. Thus, although a reference table is not created in advance upon system boot-up, the reference table is automatically created simultaneously with its boot-up.

In Step 403, the handover base station selector 302 matches handover adding reference tables $U_i$ and matching-orientated tables $U_m$ with one another to thereby calculate the maximum matching strength $ST_{add}$. When it is found in Step 404 that the maximum matching strength $ST_{add}$ is less than the matching strength threshold $TH_{match}$, the handover base station selector 302 proceeds to Step 801, where the handover base station selector 302 examines the number of handover adding reference tables $N_{add\_table}$ registered in the reference table storage part 306 of the memory unit 212.

When the number of the reference tables $N_{add\_table}$ is less than a lower-limit value a of the registered number of tables as a result of the examination of $N_{add\_table}$ in Step 801, the handover base station selector 302 determines that the sufficient learning of handover adding operation is not performed and the number of the handover adding reference tables is insufficient. Thereafter, the handover base station selector 302 proceeds to Step 802 to carry out the normal handover adding operation. Incidentally, the lower-limit value a indicates the allowable minimum number of tables and may be determined according to simulation or experiences.

In Step 802, the handover base station selector 302 initializes a variable i used upon detecting $L_m(t)$ according to base stations. Thereafter, the handover base station selector 302 examines in Step 803 whether values $L_{m,i}(t)$ ($0 \leq i < N_m$: $N_m$ indicates the number of base stations, which is reported from a mobile station) reported according to base stations of $L_m(t)$ exceed a handover additional threshold $TH_{add}$ in the second mode.

When $L_{m,i}(t)$ greater than $TH_{add}$ is obtained in Step 803, the handover base station selector 302 refers even to the past reported values in Step 804 to obtain a time $T_{over}$ during which $L_{m,i}(t)$ is over a threshold $TH_{add}$ continuously. When it is determined in Step 805 that the time $T_{over}$ is above a threshold $T_{over\_TH}$, the handover base station selector 302 selects a base station i of $L_{m,i}(t)$ as a handover addition candidate base station in Step 806 and proceeds to Step 406.

Incidentally, these Steps are effective when reference tables are normally few in number as well as at the beginning of the system boot-up.

(3) Handover Deleting Process at the Beginning of System Boot-up

Figure 9:
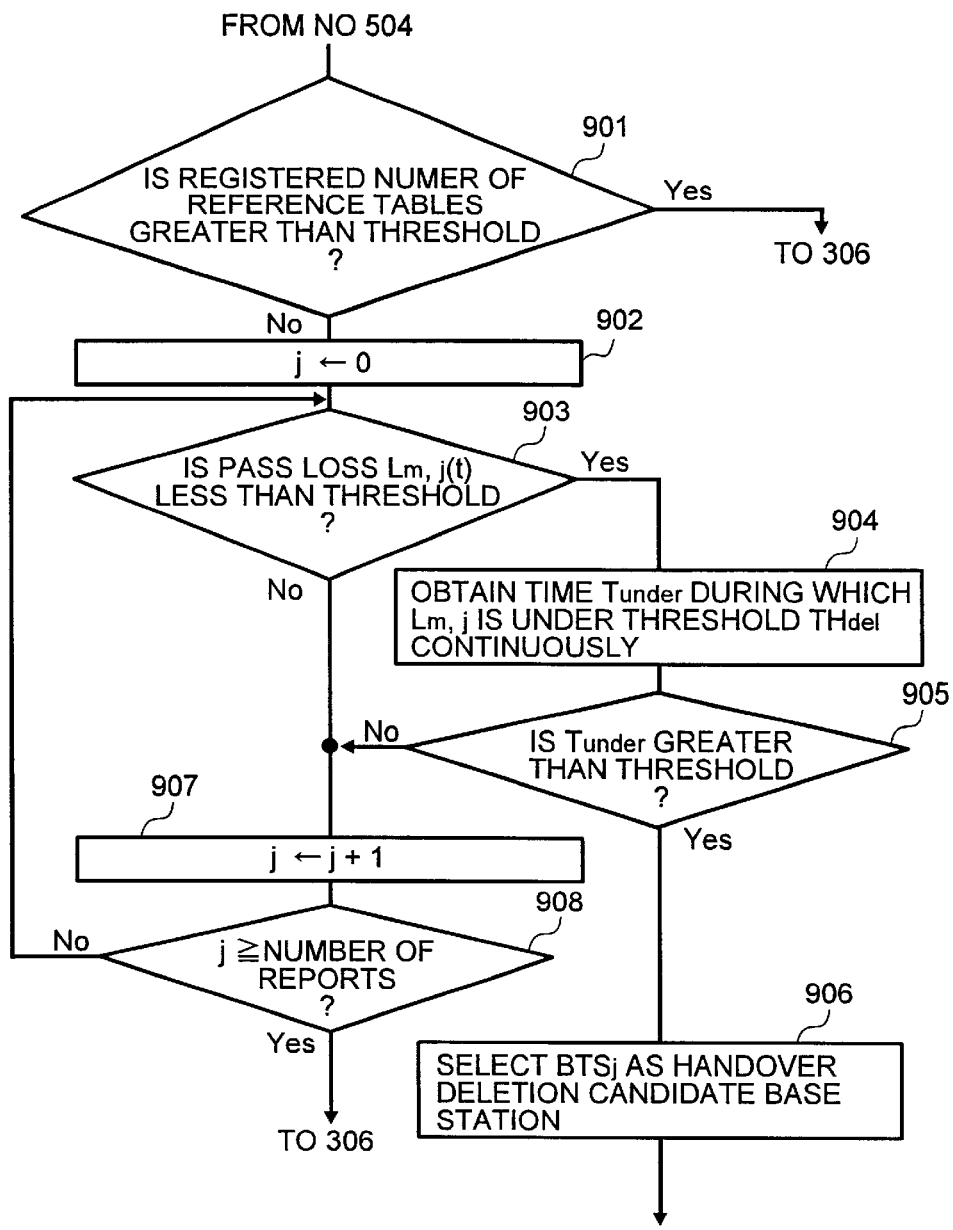
FIG. 9 illustrates a handover deleting method at the system boot-up.

FIG. 9 shows a handover deleting process at the beginning of system boot-up. In the invention of the present application, the shortage of matching strength produced due to the fact that the registered number of reference tables at the beginning of system boot-up or the like is insufficient, is solved by a two-mode handover method in a manner similar to the time when handover is added. Namely, the handover deleting method disclosed in FIG. 5 is used as a first mode and a method to be described later is used as a second mode.

In Step 503, the handover base station selector 302 matches $U_j$ with $U_m$ to calculate the maximum matching strength $ST_{del}$. Thereafter, when the handover base station selector 302 determines in Step 504 that the maximum matching strength $ST_{del}$ is less than the matching threshold $TH_{match}'$, it examines the number of handover deleting reference tables $N_{del\_table}$ registered in the reference table storage part 306 of the memory unit 212.

When the number of the reference tables $N_{del\_table}$ is less than a lower-limit value b of the registered number of tables as a result of the examination of $N_{del\_table}$ in Step 901, the handover base station selector 302 determines that the sufficient learning of handover deleting operation is not performed and the number of the handover deleting reference tables is insufficient, and executes the second mode subsequent to Step 902. Incidentally, the lower-limit value b indicates the allowable minimum number of tables and may be determined according to simulation or experiences.

In Step 902, the handover base station selector 302 initializes a variable for detecting values $L_m(t)$ of pass losses and SIR reported from a mobile station m according to base stations. Thereafter, the handover base station selector 302 examines in Step 903 whether values $L_{m,j}(t)$ reported according to base stations are less than a handover deletion threshold $TH_{del}$ in the second mode.

When $L_{m,j}(t)$ less than $TH_{del}$ is obtained in Step 903, the handover base station selector 302 refers even to the past reported values in Step 904 to obtain a time $TH_{under}$ during which $L_{m,j}(t)$ is under the threshold $TH_{del}$ continuously. When it is determined in Step 905 that the time $T_{under}$ is above a threshold $T_{under\_TH}$, the handover base station selector 302 selects a base station j of $L_{m,j}(t)$ as a handover deletion candidate base station and proceeds to Step 506.

2. Second Embodiment (1) Handover Adding Process

Figure 3B:
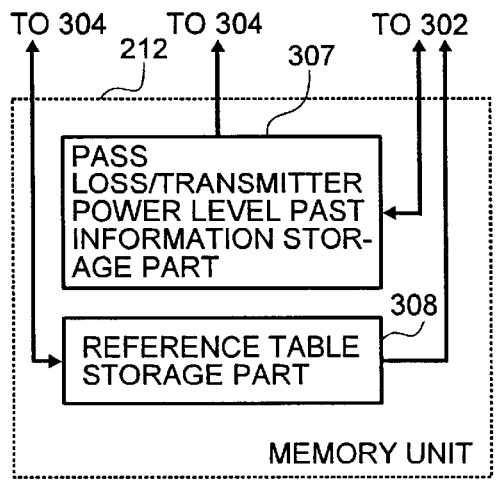
FIG. 3B depicts another configuration of the memory unit.
Figure 3C:
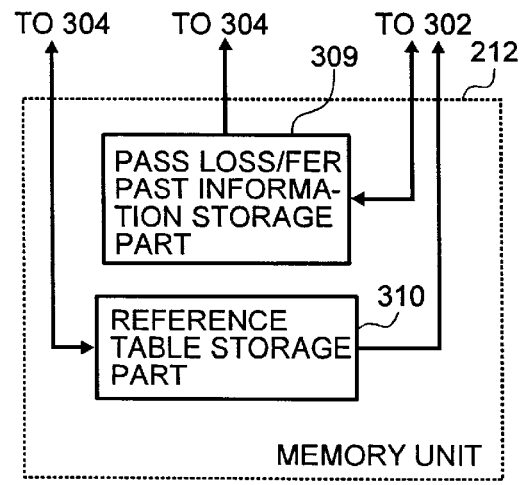
FIG. 3C shows a further configuration of the memory unit.

Another embodiment according to the invention of the present application will hereinafter be described using FIGS. 10 and 3B and the like. In the second embodiment, a transmitter power level set for a communication channel transmitted by a base station is used instead of the aforementioned SIR.

Figure 10:
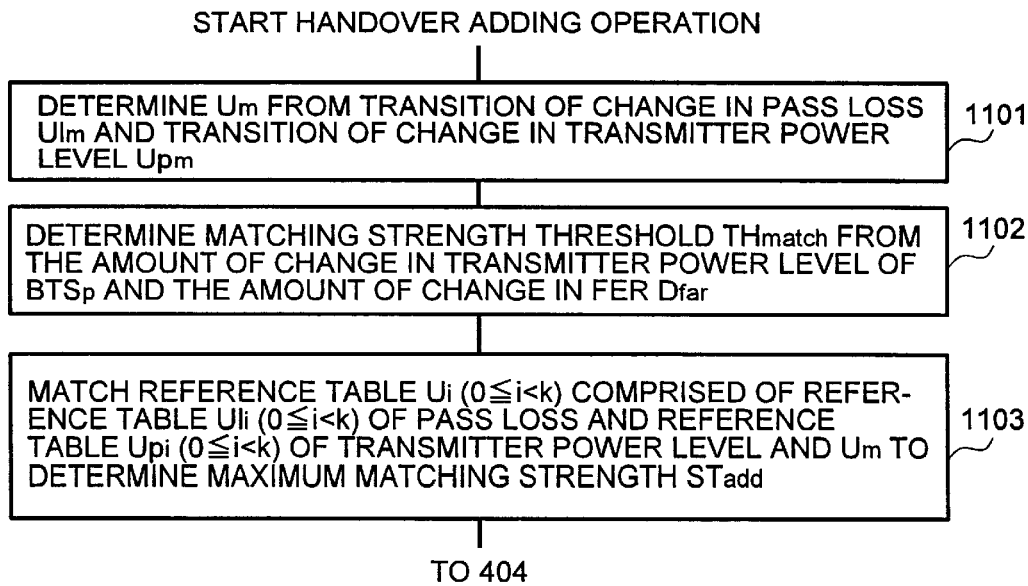
FIG. 10 depicts a handover adding method using a transmitter power level.

FIG. 10 shows another embodiment using a handover adding process. A mobile station m measures a pass loss of a pilot channel transmitted by a connected base station and a pass loss of a pilot channel transmitted by a non-connected base station at a time t and reports the result of measurement $L_m(t)$ to a base station controller through the connected base station. Further, the connected base station reports a transmitter power level $P_m(t)$ for the traffic channel transmitted to the mobile station m to the base station controller. A handover base station selector 302 receives $L_m(t)$ and $P_m(t)$ through a control signal analyzer 301. In Step 1101, the handover base station selector 302 determines a change transition $Ul_m = u[L_m(t-n), L_m(t)]$ from pass losses $L_m(t-n)$ to $L_m(t)$ and a change transition $Up_m = u[P_m(t-n), P_m(t)]$ from transmitter power levels $P_m(t-n)$ to $P_m(t)$. The handover base station selector 302 stores $Ul_m$ and $Up_m$ in a pass loss/transmitter power level past information storage part 307. The handover base station selector 302 creates a matching-orientated table $U_m = [Ul_m, Up_m]$ from $Ul_m$ and $Up_m$ and stores it in the pass loss/transmitter power level past information storage part 307. FIG. 17 shows an example of $U_m$. $U_m$ has pass losses of pilot channels reported by mobile stations, transmitter power levels of traffic channels transmitted by connected base stations, and FER of each uplink traffic channel as time-sequential data at times t–n to t.

In Step 1102, the handover base station selector 302 selects a base station $BTS_p$ which minimizes the pass loss of the pilot channel, from a plurality of connected base stations. Continuously, the handover base station selector 302 calculates the amount of change $D_p'=d[P_{m,p}(t-n),P_{m,p}(t)]$ in transmitter power level $P_{m,p}(t)$ of traffic channel transmitted from $BTS_p$ to the mobile station m within a unit time (times t−n to t). Further, the handover base station selector 302 calculates the amount of change $D_{fer}=d[Fer_{m,p}(t-n),Fer_{m,p}(t)]$ in FER of uplink traffic channel measured by $BTS_p$ at the times t−n to n. The handover base station selector 302 determines a matching strength threshold $TH_{match}=thre(D_p',D_{fer})$ using $D_p'$ and $D_{fer}$ referred to above. As a method of determining $TH_{match}$, the same method as the aforementioned handover adding process may be adopted.

In Step 1103, the handover base station selector 302 matches handover adding reference tables $U_i$ and $U_m$ with one another to thereby calculate the maximum matching strength $ST_{add}$. FIG. 21 shows an embodiment illustrative of $U_i$. A reference table storage part 308 stores $U_i$ as the past result of learning. $U_i$ includes a transition $Ul_i=u[L_i(0),L_i(n)]$ of a change in pass loss $L_i(t)$, a transition $Up_i=u[P_i(0),P_i(n)]$ of a change in transmitter power level $P_i(t)$, and handover addition-destined base stations at that time. $U_i$ is stored in the reference table storage part 308.

After the calculation of $ST_{add}$ in Step 1103, the handover base station selector 302 proceeds to Step 404. The subsequent processes are similar to the best mode.

(2) Handover Deleting Process

Figure 11:
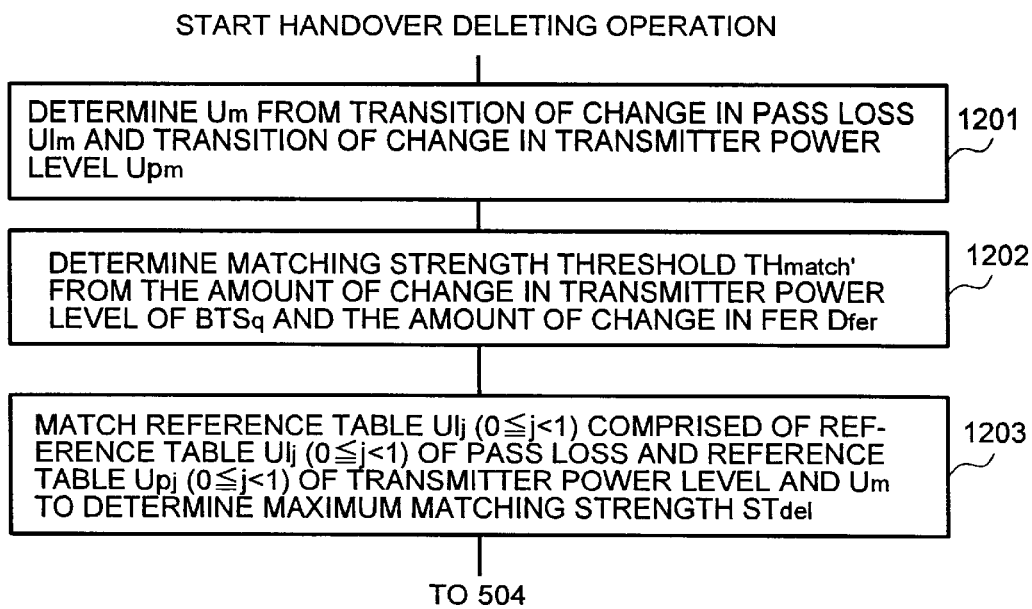
FIG. 11 shows a handover deleting method using a transmitter power level.

FIG. 11 shows an embodiment of another handover deleting process. In the present embodiment, a transition of a change in transmitter power level of downlink traffic channel is used in place of the transition of change in SIR.

In Step 1201, the handover base station selector 302 determines a transition $Ul_m=u[L_m(t-n),L_m(t)]$ of a change from pass losses $L_m(t-n)$ to $L_m(t)$, and a transition $Up_m=u[P_m(t-n),P_m(t)]$ of a change from transmitter power levels $P_m(t-n)$ to $P_m(t)$ The handover base station selector 302 stores $Ul_m$ and $Up_m$ in the pass loss/transmitter power level past information storage part 307. The handover base station selector 302 creates a matching-orientated table $U_m=[Ul_m, Up_m]$ from $Ul_m$ and $Up_m$ and stores it in the pass loss/transmitter power level past information storage part 307. An example illustrative of $U_m$ is shown in FIG. 17.

In Step 1202, the handover base station selector 302 selects a base station $BTS_q$ which minimizes a pass loss of a pilot channel, from a plurality of connected base stations. Continuously, the handover base station selector 302 calculates the amount of change $D_q'=d[P_{m,q}(t-n),P_{m,q}(t)]$ in transmitter power level $P_{m,q}(t)$ of traffic channel transmitted from $BTS_q$ to the mobile station m within a unit time (times t−n to t). Further, the handover base station selector 302 calculates the amount of change $D_{fer}=d[Fer_{m,q}(t-n),Fer_{m,q}(t)]$ in FER of uplink traffic channel measured by $BTS_q$ at the times t−n to n. The handover base station selector 302 determines a matching strength threshold $TH_{match}'=thre'(D_q',D_{fer})$ using $D_q'$ and $D_{fer}$ referred to above. As a method of determining $TH_{match}'$, the same method as the aforementioned handover deleting process may be adopted.

In Step 1203, the handover base station selector 302 matches handover deleting reference tables $U_j$ and $U_m$ with one another to thereby calculate the maximum matching strength $ST_{del}$. FIG. 21 shows an embodiment illustrative of $U_j$. A reference table storage part 308 stores $U_j$ as the past result of learning. $U_j$ includes a transition $Ul_j=u[L_j(0),L_j(n)]$ of a change in pass loss $L_j(t)$, a transition $Up_j=u[P_j(0),P_j(n)]$ of a change in transmitter power level $P_j(t)$, and handover deletion-destined base stations at that time. $U_j$ is stored in the reference table storage part 308.

After the calculation of $ST_{del}$ in Step 1203, the handover base station selector 302 proceeds to Step 504. The subsequent processes are similar to the best mode.

3. Third Embodiment

In the third embodiment, FER of an uplink traffic channel measured by each base station is used in place of the SIR and transmitter power level.

Figure 22:
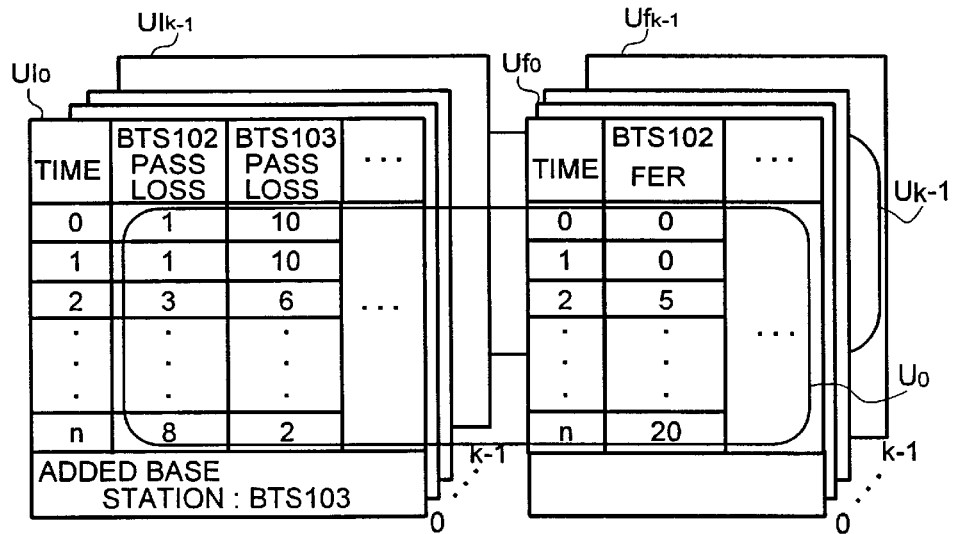
FIG. 22 depicts handover adding reference tables in which pass losses and FER are stored.

FIGS. 14 and 15 respectively show an embodiment using a transition $Uf_m=u[Fer_m(t-n),Fer_m(t)]$ of a change in FER of uplink traffic channel measured by each connected base station in place of the transition $Up_m$ of change in transmitter power level. FIG. 18 shows an example illustrative of $U_m=[Ul_m,Uf_m]$. A pass loss/FER past information storage part 309 stores, as Um, pass losses of pilot channels reported from each individual mobile stations and FER of uplink traffic channels measured by the connected base stations. FIG. 22 shows an example illustrative of $U_i=[Ul_i,Uf_i]$ and $U_j=u[Ul_j,Uf_j]$. A reference table storage part 310 stores $Ul_i=u[L_i(0),L_i(n)]$ and $Uf_i=u[Fer_i(0),Fer_i(n))$ therein as learned time-sequential data. Deleted base stations are registered in $U_j$ in place of added base stations. A method of calculating a matching strength threshold and a process for selecting addition/deletion candidates to handover are similar to the example shown in FIG. 10 or 11.

4. Fourth Embodiment

Each of the methods of performing the handover adding/deleting operations, which are shown in FIGS. 8 and 9, corresponds to a method of changing a handover executing method, based on the registered number of reference tables. However, when base stations are increased or taken out after learning data is stored to some extent after system boot-up, it is necessary to re-create the learning data from the beginning. On the other hand, since each of methods shown in FIGS. 12 and 13 is a method of changing a handover method, based on a result of comparison between a combination of base stations having received channels intended for the measurement of received levels reported from each mobile station and a combination of base stations written in each reference table, learning data can be updated even if an increase in and removal of base stations being in system operation are performed.

(1) Handover Addition at the Beginning of System Boot-up

Figure 12:
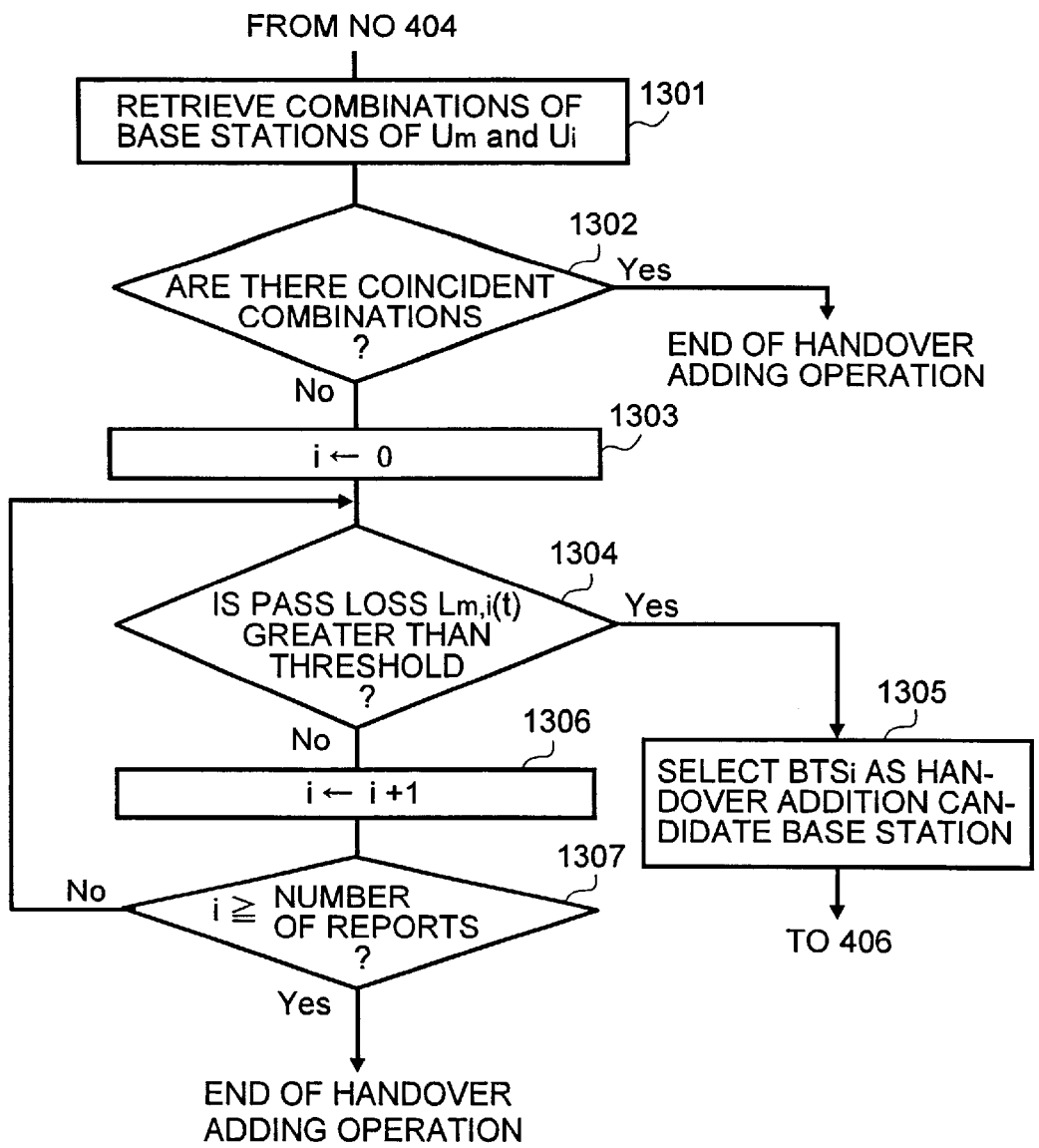
FIG. 12 illustrates another handover adding method at system boot-up.
Figure 13:
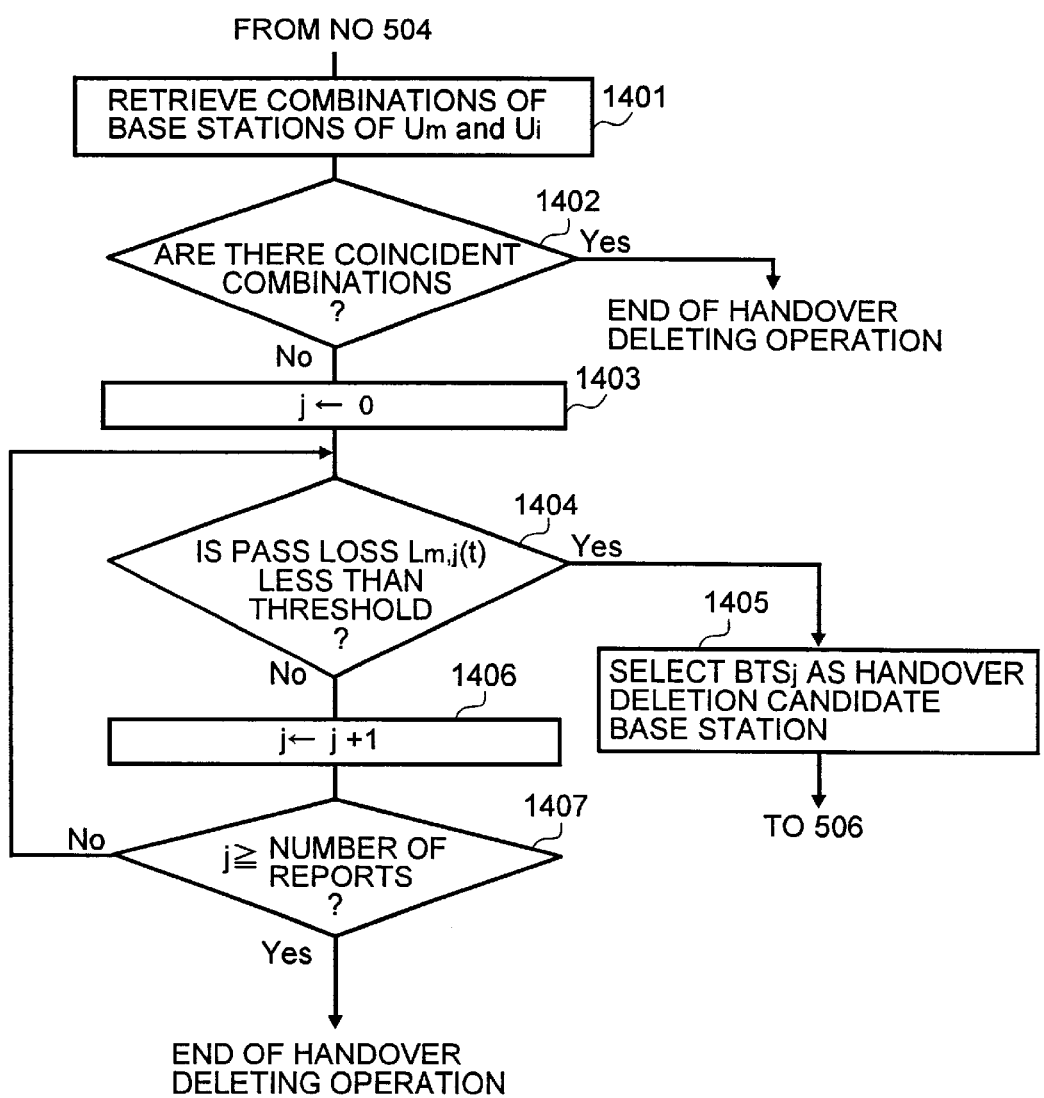
FIG. 13 depicts another handover deleting method at system boot-up.

FIG. 12 shows a handover processing method at the beginning of another system boot-up. According to the present method, combinations of base stations written in a matching-orientated table and a handover adding reference table respectively are retrieved to select an additional candidate.

In Step 403, a handover base station selector 302 matches handover adding reference tables $U_i$ with a transition $U_m$ of a change in pass loss and SIR reported from each mobile station m to calculate the maximum matching strength $ST_{add}$. When the maximum matching strength $ST_{add}$ is found to be less than the matching strength threshold $TH_{match}$ in Step 404, the handover base station selector 302 proceeds to Step 1301, where it retrieves a plurality of reference tables $U_i$ as a combination key of connected/non-connected base stations recorded in each matching-orientated table $U_m$. In Step 1302, the handover base station selector 302 makes a decision as to whether $U_i$ having combinations of base stations coincident with $U_m$ exist. If not so, it means that the learning of handover is insufficient and reference tables are low in number. Therefore, the handover base station selector 302 proceeds to Step 1303 to perform a normal handover. The normal handover is a method of performing it using additional thresholds $TH_{add}$ held by each base station as defaults in place of the additional thresholds obtained from the previously-described result of learning. In Step 1303, the handover base station selector 302 initializes a variable i for retrieving $L_m(t)$ according to base stations. Namely, ones suitable for addition to handover are extracted from a plurality of base stations. In Step 1304, the handover base station selector 302 examines whether values $L_{m,i}(t)$ reported according to base stations of $L_m(t)$ exceed the handover additional threshold $TH_{add}$. When $L_{m,i}(t)$ greater than $TH_{add}$ is obtained in Step 1304, the handover base station selector 302 selects a base station $BTS_i$ of $L_{m,i}(t)$ as a handover additional candidate base station and proceeds to Step 406. Incidentally, when $L_{m,i}(t)$ greater than $TH_{add}$ is not obtained, the handover base station selector 302 increments i in Step 1306 and compares i and the number of reports in Step 1307. Here, the number of the reports means the total number of base stations existent in adjoining places. If i is greater than or equal to the number of the reports, then the handover base station selector 302 determines that there are no suitable additional candidates and terminates the handover adding process. If i is less than the number of the reports, then the handover base station selector 302 proceeds to Step 1304, where it examines another i+1th base station.

(2) Handover Deleting Process at the Beginning of System Boot-up:

FIG. 13 shows another example of the selecting process at the beginning of the system boot-up shown in FIG. 9. In the present method, combinations of base stations written in a matching-orientated table $U_m$ and a handover deleting reference table $U_j$ respectively are retrieved to select a deletion candidate.

In Step 503, the handover base station selector 302 matches the reference table $U_j$ and matching-orientated table $U_m$ with each other to thereby calculate the maximum matching strength $ST_{del}$. When the maximum matching strength $ST_{del}$ is found to be less than the matching strength threshold $TH_{match}'$ in Step 504, the handover base station selector 302 compares combinations of connected/non-connected base stations written in $U_m$ and the handover deleting reference table $U_j$ in Step 1401.

When the handover base station selector 302 determines in Step 1402 that there are no handover deleting reference tables $U_j$ having combinations of base stations coincident with $U_m$, it proceeds to Step 1403. This is because since it is considered that the sufficient learning of handover deleting operation is not performed and the handover deleting reference tables are low in number, a normal handover deleting process may preferably be done. The normal handover is a method of performing it using deletion thresholds $TH_{del}$ held by each base station as defaults in place of the deletion thresholds obtained from the previously-described result of learning.

In Step 1403, the handover base station selector 302 initializes a variable j for retrieving $L_m(t)$ according to base stations. Thereafter, the handover base station selector 302 examines in Step 1304 whether $L_{m,j}(t)$ indicative of values reported according to base stations is less than the normal handover deletion threshold $TH_{del}$.

When $L_{m,j}(t)$ less than $TH_{del}$ is obtained in Step 1404, the handover base station selector 302 selects a base station $BTS_j$ of $L_{m,j}(t)$ as a handover deletion candidate base station in Step 1405 and proceeds to Step 506. Incidentally, when $L_{m,j}(t)$ less than $TH_{del}$ is not obtained, the handover base station selector 302 increments j in Step 1406 and compares j and the number of reports in Step 1407. Here, the number of the reports means the total number of base stations existent in adjoining places. If j is greater than or equal to the number of the reports, then the handover base station selector 302 determines that there are no suitable deletion candidates and terminates the handover deleting process. If j is less than the number of the reports, then the handover base station selector 302 proceeds to Step 1404, where it examines another j+1th base station.

5. Other Embodiments

Figure 23:
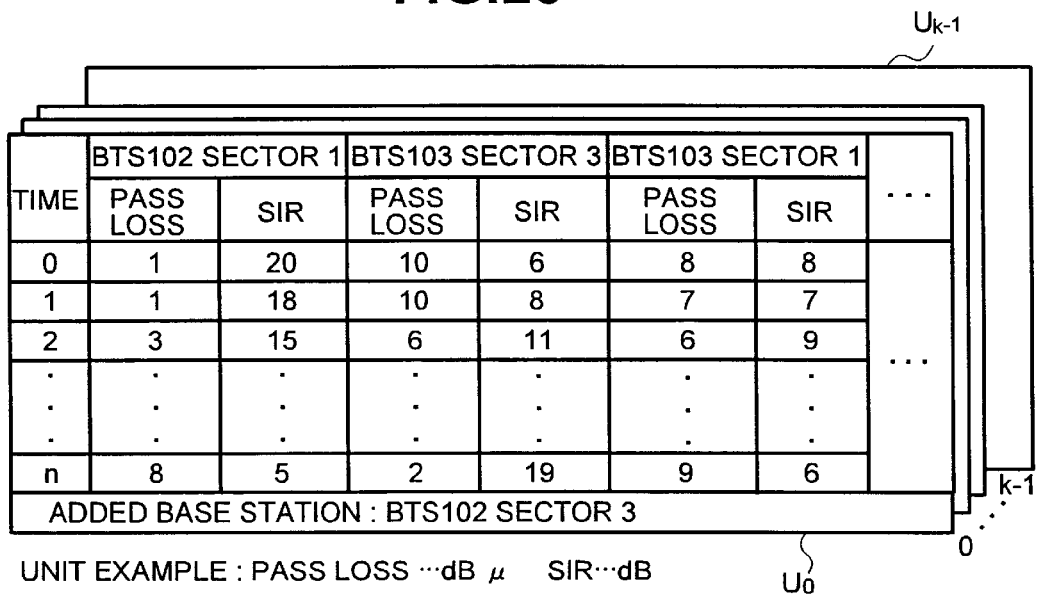
FIG. 23 shows sector-to-sector handover reference tables.

In the above-described embodiments, the handover between a cell and cell, which forms one service area per base station, has been used. However, as shown in FIG. 23, handover adding/deleting operations can be carried out by the same procedure as the aforementioned cell-to-cell handover even in the case of handover between a sector and a sector by registering even sector numbers in reports on pass losses/SIR or the like from reference tables or mobile stations.

Further, the aforementioned base station controller is capable of performing, according to the modes, the switching between the case in which the above-described handover adding reference tables and handover deleting reference tables are updated using data from all the mobile stations being in communication under the control of the base station controller, and the updated reference tables are used for handover operations of all the mobile stations, and the case in which reference tables are created every mobile stations and updated using data about pass losses and SIR related to only users for the mobile stations, and the updated reference tables are used only for handover operations of the users for the mobile stations. Namely, a shared table and tables inherent in mobile stations are suitably switched to a plurality of mobile stations. While the above-described embodiments respectively show the method of optimizing the handover operation within the base station controller, switchers may be provided with the same function. Base stations can be also provided with the above-described method of optimizing the handover operation, by causing mobile stations to have the function of inquiring of the base station controller information about the respective base stations.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A mobile communication system comprising:

means for collecting periodically a plurality of first signal quality data between a mobile station and a plurality of base stations connected to the mobile station simultaneously, and collecting periodically a plurality of second signal quality data between said mobile station and a plurality of base stations which are not connected to said mobile station;

first storage means for storing said plurality of first signal quality data and said plurality of second signal quality data as time-sequential data;

second storage means for storing time-sequential data of past base station reception quality and additional handover candidates corresponding to the time-sequential data;

means for comparing time-sequential data stored in said first storage means and time-sequential data stored in said second storage means, specifying a transition of similar past signal quality data and selecting a handover destined base station corresponding to the specified transition of past signal quality data from said second storage means; and means for connecting said mobile station to the handover destined base station selected by said means for selecting to conduct handover operation.

2. A mobile communication system according to claim 1, further comprising:

means for updating said time-sequential data stored in said second storage means, when the handover operation is carried out.

3. A mobile communication system according to claim 2, wherein when a handover-destined base station has failed in conducting the handover operation even when the number of times the handover operation is retried exceeds a predetermined number of retries, said means for updating updates the time-sequential data stored in said second storage means so that the corresponding handover-destined base station having failed in conducting the handover operation becomes hard to be selected as the handover-destined base station upon the following handover.

4. A mobile communication system according to claim 3, further comprising:

a counter which counts the number of times that the handover operation is retried, after the commencement of a first handover operation; and means for comparing the value of said counter and a threshold, wherein when the value of said counter exceeds the threshold, said means for updating updates the time-sequential data stored in said second storage means so that said handover-destined base station becomes hard to be selected as a handover-destined base station upon the following handover operation.

5. A mobile communication system according to claim 2, wherein said means for updating updates the time-sequential data stored in said second storage means so that a handover-destined base station from which handover is deleted immediately after a success in the handover operation, becomes hard to be selected as a handover-destined base station upon the following handover operation.

6. A mobile communication system according to claim 5, further comprising:

a timer which measures a time interval required to delete a handover-destined base station having succeeded in the handover operation from a handover destination; and means for comparing the value of said timer and a threshold, wherein when the value of said timer is less than or equal to the threshold, said means for updating updates the time-sequential data stored in said second storage means so that the handover-destined base station becomes hard to be selected as a handover destined base station upon the following handover operation.

7. A mobile communication system comprising:

means for collecting periodically a plurality of first signal quality data between a mobile station and a plurality of base stations connected to the mobile station simultaneously, and collecting periodically a plurality of second signal quality data between said mobile station and a plurality of base stations which are not connected to said mobile station;

means for learning data for judging handover, based on said plurality of first signal quality data and said plurality of second signal quality data;

means for controlling a handover between said mobile station and each base station corresponding to a handover addition or deletion candidate of said mobile station, based on data learned by said means for learning and said plurality of first signal quality data and said plurality of second quality data;

means for storing said plurality of first signal quality data and said plurality of second quality data, as time-sequential data therein; and means for storing handover-destined base stations corresponding to the time-sequential data indicative of the signal quality, wherein said means for controlling comprises:

means for comparing a transition of time-sequential data about the present signal quality and time-sequential data about the past signal quality stored in said means for storing handover-destined base station, specifying a transition of similar past signal quality data, and selecting a handover-destined base station corresponding to the specified transition of past signal quality data from said means for storing handover-destined base station, and means for connecting said mobile station to the handover-destined base station selected by said means for selecting, wherein when a handover-destined base station has failed in handover still even when the number of times that handover is retried exceeds a predetermined number of retries, said handover control circuit updates the time-sequential data stored in said means for storing handover-destined base station so that the corresponding handover-destined base station having failed in handover becomes hard to be selected as the handover-destined base station upon the following handover.

8. A mobile communication system according to claim 7, further comprising:

a counter which counts the number of times that the handover is retried, after the commencement of the handover; and means for comparing the value of said counter and a threshold, wherein when the value of said counter exceeds the threshold, said means for learning updates the time-sequential data stored in said means for storing handover-destined base station so that said handover-destined base station becomes hard to be selected as a handover-destined base station upon the following handover.

9. A mobile communication system comprising:

means for collecting periodically a plurality of first signal quality data between a mobile station and a plurality of base stations connected to the mobile station simultaneously, and collecting periodically a plurality of second signal quality data between said mobile station and a plurality of base stations which are not connected to said mobile station;

means for learning data for judging handover, based on said plurality of first signal quality data and said plurality of second signal quality data;

means for controlling a handover between said mobile station and each base station corresponding to a handover addition or deletion candidate of said mobile station, based on data learned by said means for learning and said plurality of first signal quality data and said plurality of second quality data;

means for storing said plurality of first signal quality data and said plurality of second quality data, as time-sequential data therein; and means for storing handover-destined base stations corresponding to the time-sequential data indicative of the signal quality, wherein said means for controlling comprises:

means for comparing a transition of time-sequential data about the present signal quality and time-sequential data about the past signal quality stored in said means for storing handover-destined base station, specifying a transition of similar past signal quality data, and selecting a handover-destined base station corresponding to the specified transition of past signal quality data from said means for storing handover-destined base station, and means for connecting said mobile station to the handover-destined base station selected by said means for selecting, wherein said means for learning updates the time-sequential data stored in said means for storing handover-destined base station so that a handover-destined base station from which handover is deleted immediately after a success in handover, becomes hard to be selected as a handover-destined base station upon the following Handover.

10. A mobile communication system according to claim 9, further comprising:

a timer which measures a time interval required to delete a handover-destined base station having succeeded in handover from a handover destination; and means for comparing the value of said timer and a threshold, wherein when the value of said timer is less than or equal to the threshold, said means for learning updates the time-sequential data stored in said means for storing handover-destined base station so that the handover-destined base station becomes hard to be selected as a handover destined base station upon the following handover.

11. A mobile communication system according to claim 1, further comprising:

a third storage means for storing time-sequential data of past base station reception quality and handover deletion candidates corresponding to the time-sequential data;

means for comparing time-sequential data stored in said first storage means and time-sequential data stored in said third storage means, specifying a transition of similar past signal quality data, and selecting a handover deletion base station corresponding to the specified transition of past signal quality data from said third storage means; and means for setting free the connection to the base station selected by said means for selecting.

12. A mobile communication system according to claim 11, further comprising:

a timer measures a time interval required to add the handover deletion base station to handover again after the deletion of the handover deletion base station, and means for comparing the value of said timer and a threshold, wherein when the value of said timer is under the threshold, said means for updating updates the time-sequential data stored in said third storage means so that the handover deletion base station becomes hard to be selected as a handover deletion base station upon the following handover.

13. A mobile communication system according to claim 11, further comprising:

means for determining an additional condition for allowing of the addition of each base station deleted from handover to the handover again, based on the reception quality of the handover deletion base station selected by said means for selecting and the reception quality data of the base station being in connection with said mobile station.

* * * * *